United States Patent
Mills et al.

(10) Patent No.: US 10,603,605 B1
(45) Date of Patent: Mar. 31, 2020

(54) FLOAT MEMBER OF VARIABLE DENSITY FOR SEPARATION OF FLUID

(71) Applicant: Guardian Systems, LLC, Kingfisher, OK (US)

(72) Inventors: Brent A Mills, Kingfisher, OK (US); Cody Cook, Elk City, OK (US); Joel H Young, Norman, OK (US); Justin Mark Snodgrass, Kingfisher, OK (US)

(73) Assignee: Guardian Systems, LLC, Kingfisher, OK (US)

( * ) Notice: Subject to any disclaimer, the term of this patent is extended or adjusted under 35 U.S.C. 154(b) by 118 days.

(21) Appl. No.: 15/587,690

(22) Filed: May 5, 2017

Related U.S. Application Data

(63) Continuation-in-part of application No. 14/756,941, filed on Oct. 30, 2015, now abandoned.
(Continued)

(51) Int. Cl.
  *B01D 17/02* (2006.01)
  *B01D 17/00* (2006.01)
  (Continued)

(52) U.S. Cl.
  CPC ......... *B01D 17/0214* (2013.01); *B01D 17/00* (2013.01); *B01D 17/12* (2013.01);
  (Continued)

(58) Field of Classification Search
  None
  See application file for complete search history.

(56) References Cited

U.S. PATENT DOCUMENTS

| 368,544 A | 8/1887 | Morrison |
|---|---|---|
| 2,037,245 A | 4/1936 | Leifheit et al. |

(Continued)

FOREIGN PATENT DOCUMENTS

| CN | 07229779 | 8/1995 |
|---|---|---|
| CN | 202620789 | 12/2012 |
| EP | 1093835 | 4/2001 |

OTHER PUBLICATIONS

Invitation to Pay Additional Fees and, Where Applicable, Protest Fee, from the International Searching Authority, dated Jan. 22, 2016 regarding PCT application PCT/US2015/000123 filed Oct. 30, 2015.
(Continued)

*Primary Examiner* — Richard C Gurtowski
(74) *Attorney, Agent, or Firm* — Michael S. Young IP Law LLC; Michael S. Young

(57) ABSTRACT

An apparatus may include a float member and an output line. The float member is configured in contacting adjacency to first and second liquids contained in a container. The first liquid is less dense than the second liquid such that the first liquid floats on top of the second liquid. The float member may have a specific gravity selected responsive to the first and second liquids. When the second liquid is pulled from the container through the output line to a predetermined level, the float member occludes the output line. The specific gravity of the float member may be selected based on the fluid in the container previously, currently, or in the future, or some combination of the three. The specific gravity of the float member may be adjusted by changing material within the float member or changing the float member itself from a plurality of float members.

10 Claims, 20 Drawing Sheets

Related U.S. Application Data

(60) Provisional application No. 62/072,683, filed on Oct. 30, 2014.

(51) Int. Cl.
  | | |
  |---|---|
  | *C02F 1/40* | (2006.01) |
  | *C02F 1/00* | (2006.01) |
  | *B01D 17/12* | (2006.01) |
  | *C02F 101/32* | (2006.01) |
  | *C02F 103/10* | (2006.01) |

(52) U.S. Cl.
   CPC .............. *C02F 1/008* (2013.01); *C02F 1/40* (2013.01); *C02F 2101/32* (2013.01); *C02F 2103/10* (2013.01)

(56) References Cited

U.S. PATENT DOCUMENTS

| | | |
|---|---|---|
| 2,701,620 A | 2/1955 | Crawford |
| 3,115,888 A | 12/1963 | Moyer |
| 3,335,866 A | 8/1967 | Venter et al. |
| 3,385,440 A | 5/1968 | Ray |
| 3,852,193 A * | 12/1974 | Jakubek ............ B01D 17/0202 210/744 |
| 4,055,499 A | 10/1977 | Laxo |
| 4,132,238 A | 1/1979 | Clark |
| 4,436,630 A | 3/1984 | Anderson |
| 4,723,565 A | 2/1988 | Delwiche |
| 4,960,513 A | 10/1990 | Young |
| 5,161,564 A | 11/1992 | Clark |
| 5,348,041 A | 9/1994 | Clark |
| 5,441,070 A | 8/1995 | Thompson |
| 5,730,872 A | 3/1998 | Rhodes |
| 5,739,440 A | 4/1998 | Diadelfo et al. |
| 6,736,964 B1 | 5/2004 | Caldwell |
| 7,798,217 B2 | 9/2010 | Lantz |
| 2005/0257830 A1 | 11/2005 | Nonnie |
| 2007/0295225 A1 | 12/2007 | Meierfrankenfeld |
| 2008/0087209 A1 * | 4/2008 | Yoshida ................ B63B 22/20 114/333 |
| 2008/0190961 A1 * | 8/2008 | Wyner ................ B05B 11/0043 222/207 |
| 2013/0092640 A1 | 4/2013 | Cassidy et al. |

OTHER PUBLICATIONS

International Preliminary Report on Patentability, from the International Bureau of WIPO, dated May 11, 2017 regarding PCT application PCT/US2015/000123 filed Oct. 30, 2015.

* cited by examiner

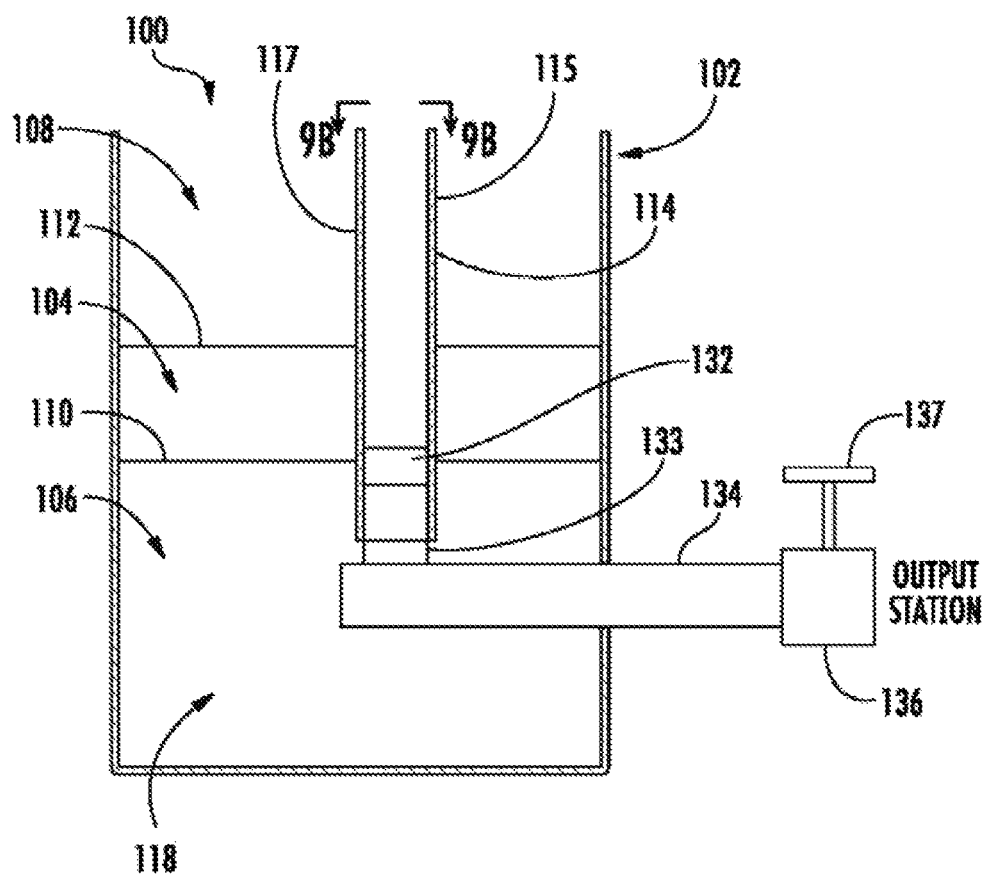
FIG. 9A
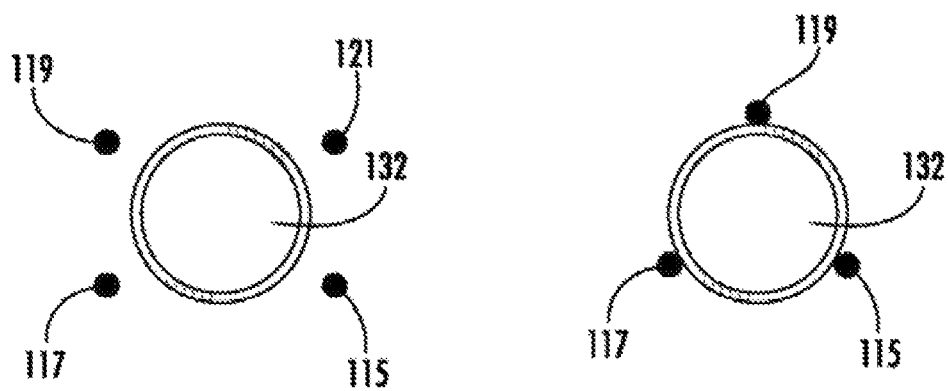
FIG. 9B
FIG. 9C

FLOAT MEMBER OF VARIABLE DENSITY FOR SEPARATION OF FLUID

RELATED APPLICATIONS

This application claims priority to U.S. Provisional patent application Ser. No. 14/756,941 filed on Oct. 30, 2015, entitled "DEVICE AND METHOD FOR SEPARATION OF FLUID," which claims priority to No. 62/072,683 filed on Oct. 30, 2014, entitled "DEVICE AND METHOD FOR SEPARATION OF FLUID," all of which are totally incorporated herein by reference.

SUMMARY

The present disclosure generally relates to a device and method for separation of fluid in a fluid storage container. By way of example and not limitation, the disclosure describes an oil loss prevention system that may eliminate unintentional monetary loss due to the disposal of marketable liquids by greatly reducing the possibility of human error.

In accordance with some embodiments, an apparatus may include a float member and an output line. The float member is configured in contacting adjacency to a first liquid and a second liquid contained in a container. The first liquid is less dense than the second liquid such that the first liquid floats on top of the second liquid. The float member may have a specific gravity selected responsive to the first and second liquids. When the second liquid is pulled from the container through the output line to a predetermined level, the float member occludes the output line. The specific gravity of the float member may be selected based on the fluid in the container previously, currently, or in the future, or some combination of the three. The specific gravity of the float member may be adjusted by changing material within the float member or changing the float member itself from a plurality of float members.

These and other features and aspects which characterize various embodiments of the present disclosure can be understood in view of the following detailed discussion and the accompanying drawings.

BRIEF DESCRIPTION OF THE DRAWINGS

FIGS. 9A-C shows an embodiment of a fluid separation device in accordance with some embodiments of the present disclosure.

DETAILED DESCRIPTION

Figure 1:
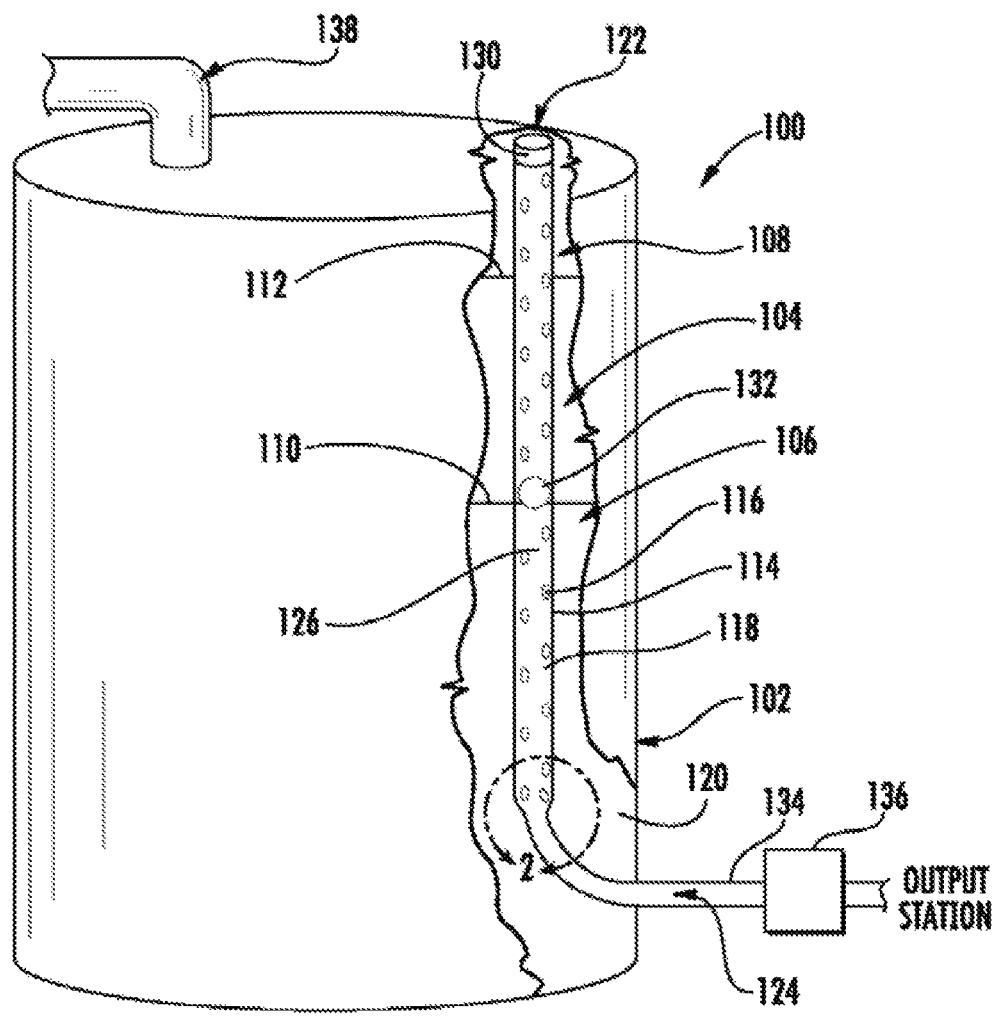
FIG. 1 shows an embodiment of a fluid separation device in accordance with some embodiments of the present disclosure.

The present disclosure generally relates to the separation of a first fluid from a second fluid in a fluid storage container. By way of example and not limitation, the disclosure describes an oil loss prevention system that may eliminate unintentional monetary loss due to the disposal of marketable liquids by greatly reducing the possibility of human error.

A fluid has particles that easily move and change their relative position without a separation of the mass, and a fluid is capable of flowing. A gas, e.g., atmosphere, air, or vapor, is a fluid. A gas has neither independent shape nor volume, and gas tends to expand indefinitely. A solid is a substance that does not flow perceptibly under moderate stress; has definite capacity for resisting forces, e.g., compression or tension, which tend to deform the substance; and retains a definite size and shape under ordinary conditions. A liquid, e.g., water or oil, is neither solid nor gas. However, a liquid is a fluid. A liquid may take the shape of its container. These are the 3 most common states of matter—solid, liquid, and gas—but other states and combinations of states are possible.

A container, such as an oil production tank, by way of example and not limitation, may be configured to contain two liquids of different density. The first liquid, e.g., oil, is less dense than the second liquid, e.g., water, also known by the chemical formula as H2O, such that the first liquid floats on the second liquid after suitable time for separation of the two liquids based on density. An oil loss prevention device is coupled to the container so that the first liquid and the second liquid may each be separately removed from the container.

The oil loss prevention device may include a retention member that is configured to retain a float member, also known as a separation member. The float member has a density greater than the first liquid and less than the second liquid. As such, the float member displaces some volume of the second liquid, much like an iceberg displaces water. The portion of the float member not displacing the second liquid is surrounded by the first liquid, so the float member also displaces some volume of the first liquid.

When the first liquid and the second liquid are poured, injected, or otherwise put into a container, the first liquid and the second liquid may be a mixture. After some period of time that is determined by characteristics of the first liquid, the second liquid, atmosphere, atmospheric pressure, temperature, etc., the first liquid and the second liquid may separate. When separated, the less dense first liquid is supported on top of the more dense second liquid. The less dense first liquid may be considered "lighter" than the more dense second fluid that may be considered "heavier."

The first liquid or the second liquid or both liquids at the same time may be removed from the container. In oil field work, the second liquid, i.e., the denser or heavier liquid, is often removed, or pulled off, by a water truck or other suitable device. A challenge in pulling off the second liquid is for an operator to know when to stop the removal operation. During the removal operation, it is possible to pull off not just the second liquid but also pull off the first liquid. In the situation where the first liquid is oil and the second liquid is water, by way of example and not limitation, the first liquid may be much more valuable than the second liquid. An owner of the contents of the container may wish to have the second liquid removed from the container, but the owner may not wish to have the first liquid removed from the container. The operator removing the liquids may use, sell, or otherwise dispose of the second liquid, and may sell the more expensive first liquid. On the other hand, the owner of the liquids in the container may wish to keep the first liquid and not have the first liquid removed from the container during the operation that removes the second liquid from the container.

The present disclosure describes an apparatus and method for removing the first liquid or the second liquid as desired, while leaving the other liquid in the container.

These and other features of various embodiments disclosed herein can be understood beginning with a review of FIG. 1 that provides a representation of a fluid separation device 100. A container 102, also know herein as a tank, is configured to contain one or more fluids. The fluids may be liquid, gas, or both liquid and gas. The container 102 may contain one liquid or a plurality of liquids. The container 102 may contain one gas or a plurality of gases. By way of concrete example and not limitation, the container 102 may be configured to contain three fluids, namely a first liquid 104, a second liquid 106, and a gas 108.

The container 102 is shown as a cylinder that is symmetric, by way of example and not limitation. The container 102 need not be symmetric, and the container 102 may be asymmetric. The container 102 may be aboveground, below ground, in fluid, or other suitable environment or combination of environments.

The first liquid 104 has a first density, and the second liquid 106 has a second density. The first density is substantially less than the second density. When the container 102 is initially filled with the first liquid 104 and the second liquid 106, there may be a mixture of the first liquid 104 and the second liquid 106. However, with time the first liquid 104 and the second liquid 106 will separate based on differences in density and other characteristics of the first liquid 104 and the second liquid 106. After separation of the first liquid 104 and the second liquid 106, the first liquid 104 will be on top of the second liquid 106, because the first liquid 104 is lighter, i.e. less dense, than the second liquid 106. The gas 108 has a third density, and the third density is less than the first density. Again, with time the gas 108 will separate from the first liquid 104 and the second liquid 106. The gas 108 will be on top of the first liquid 104, because the gas 108 is lighter, i.e. less dense, than the first liquid 104. A first interface 110 develops between the first liquid 104 and the second liquid 106. A second interface 112 develops between the first liquid 104 and the gas 108.

A retention member 114 is configured to be positioned in the container 102. The retention member 114 may be held in place in relation to the container 102 by fasteners, support members, etc. By way of example and not limitation, the fasteners may be weld, adhesive, screw and nut, and nut and bolt. The retention member 114 may have one or more aperture 116 to create a fluid communication between an interior 118 of the retention member 114 and an interior 120 of the container 102. By having a plurality of apertures 116, the interior 118 of the retention member 114 may more quickly come into fluid communication with the interior 120 of the container 102. However, only one aperture 116 for fluid communication between the interior 118 of the retention member 114 and the interior 120 of the container 102 are needed to create fluid communication. The retention member 114 may have a first end 122 and an opposing, second end 124 with a passageway 126 having an aperture 116 or a plurality of apertures 116 therebetween.

The apertures 116 may be perforations, i.e., a hole made by boring or piercing through the material, in the retention member 114, or the apertures 116 may be formed during molding, extrusion, or other manufacturing process of the body of the retention member 114. Of course, the apertures 116 may be some combination of perforation and manufacture. The aperture 116 may have a variety of shapes and sizes, e.g., circular, oval, diamond shaped, curvilinear, rectilinear, or combination of curvilinear and rectilinear. The apertures 116 in the retention member 114 may be of one substantially similar shape, one substantially similar size and one substantially similar layout configuration or the apertures 116 in the retention member 114 may be of a variety of shapes, sizes, and configurations. The apertures 116 in the retention member may have some combination of similarity and differences throughout the retention member 114.

The first end 122 of the retention member 114 may be open or may have a cap or other closer device 130. If the first end 122 of the retention member 114 has the closer device 130, then the closer device 130 may be nondestructively removable such that the first end 122 may be reusable after removal of the closer device 130. The closer device 130 may also be reusable. Of course, the first end 122 or the closer device 130 could be configured to be destroyed upon opening the retention member 114.

The retention member 114 is configured to retain a float member 132, also known as a bobber. The float member 132 is selected to have a density less than the first liquid 104 and a density greater than the second liquid 106. As described above, the situation can be envisioned to be like that of an iceberg in which some of the iceberg is seen above the ocean and another portion of the iceberg is out of sight below the level of the ocean. The float member 132 may have a substantially homogenous density. On the other hand, the float member 132 may have a heterogeneous density, e.g., the float member 132 may be chosen to have a first portion that is substantially similar to the expected density of the first liquid 104 and a second density that is substantially similar to the expected density of the second liquid 106. The float member 132 may be configured to have a predetermined ratio of the first portion to the second portion. Other examples of the float member 132 with a heterogeneous density are contemplated.

One may wish to open the retention member 114, or have an open retention member 114, so that the float member 132 can be replaced. The float member 132 may be replaced, because the float member 132 is worn down during operation, such that the float member 132 does not perform as efficiently. By replacing the float member 132, more efficient operation of the fluid separation device 100 may be possible. The float member 132 may be replaced to change the characteristics of the float member 132, such as size, style, density, etc.

The float member 132 can be a variety of shapes. The float member 132 in the shape of a sphere may be useful in permitting free movement of the float member 132 in the liquid, but other shapes are contemplated. For example, a hockey puck or disk shape may be useful if the retention member 114 is a cylinder. Other shapes for the float member 132, such as star shaped, cuboid, etc. can be chosen based on the shape of the retention member 114, the operation to be performed, etc.

When the interior 118 of the retention member 114 is in fluid communication with the liquids, e.g., the first liquid 104 and the second liquid 106, in the container 102, the liquids can go through the aperture 116 into the passageway 126 of the retention member 114. From there, the liquids may go through the passageway 126 into an output line 134 under control of a valve 136 to an output station. The output station may be a water truck, a water holding tank, a liquid holding facility, PCC pot, etc.

The container 102 may have a fill line 138 for the first liquid 104 and the second liquid 106 at the top of the container 102, as shown, or anywhere suitable in relation to the container 102, e.g., the side. The level of the liquids in the container 102 may be measured by infrared or other suitable system.

Figure 2:
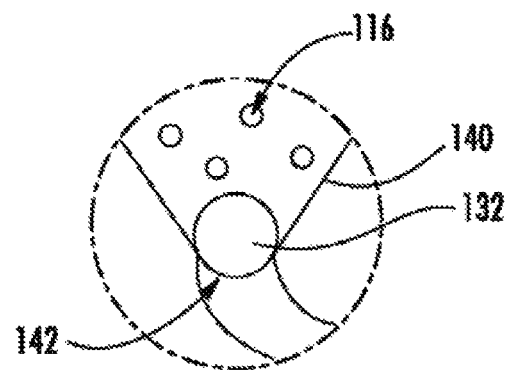
FIG. 2 shows a close-up of a portion of a fluid separation device of FIG. 1.

FIG. 2 shows an exploded view of a portion of the retention member 114 of an exemplary embodiment. The retention member 114 may have one or more apertures 116. The retention member 114 may be configured to have a swage 140 or other configuration to guide the float member 132 into an outlet aperture 142 when the second liquid 106 is removed from the container 102 to a predetermined level. When the float member 132 substantially blocks or substantially occludes the outlet aperture 142, the fluid communication is substantially interrupted between the interior 118 of the retention member 114 and the interior 120 of the container 102 and the output line 134 of the container 102.

When the outlet aperture 142 is occluded, a user cannot remove any further amount of the second liquid 106 through the outlet aperture 142 by the output line 134. While the second liquid 106 is being pulled through the outlet aperture 142, the first liquid 104 is not pulled through the outlet aperture 142, because the first liquid 104 is floating on top of the second liquid 106.

While this disclosure talks in absolute terms, one skilled in the art will understand that as one of the liquids is being pulled out of the container 102, such as the second liquid 106, there may be some turbulence in the liquids, such that a mixture may be formed and some amount of the first liquid 104 may be removed before the float member 132 closes the outlet aperture 142.

While the retention member 114 has been shown as a symmetrical cylinder, the retention member 114 may be of any suitable shape, size, and configuration. The goal of the retention member 114 is to maintain fluid communication throughout the interior 120 of the container 102 and the interior 118 of the retention member 114, such that the float member 132 is guided into position in the outlet aperture 142 to close the fluid communication of interior 120 of the container 102 and the retention member 114 with the output line 134 when the second liquid 106 is removed from the container 102 to a predetermined level.

After appropriate amount of the second liquid 106, the first liquid 104, or both the second liquid 106 and the first liquid 104 have been removed, the container 102 may be filled with more of the first liquid 104 and the second liquid 106, such that the float member 132 again floats and stops occluding the outlet aperture 142. The container 102 may be filled with the first liquid 104 and the second liquid 106 continuously over minutes, hours, days, or weeks, or other suitable time frame. The container 102 may be filled with the first liquid 104 and the second liquid 106 intermittently over minutes, hours, days, or weeks, or other suitable time frame, with each filling time interrupted by a non-filling time of seconds, minutes, hours, days, or weeks, or other suitable time frame.

Figure 3:
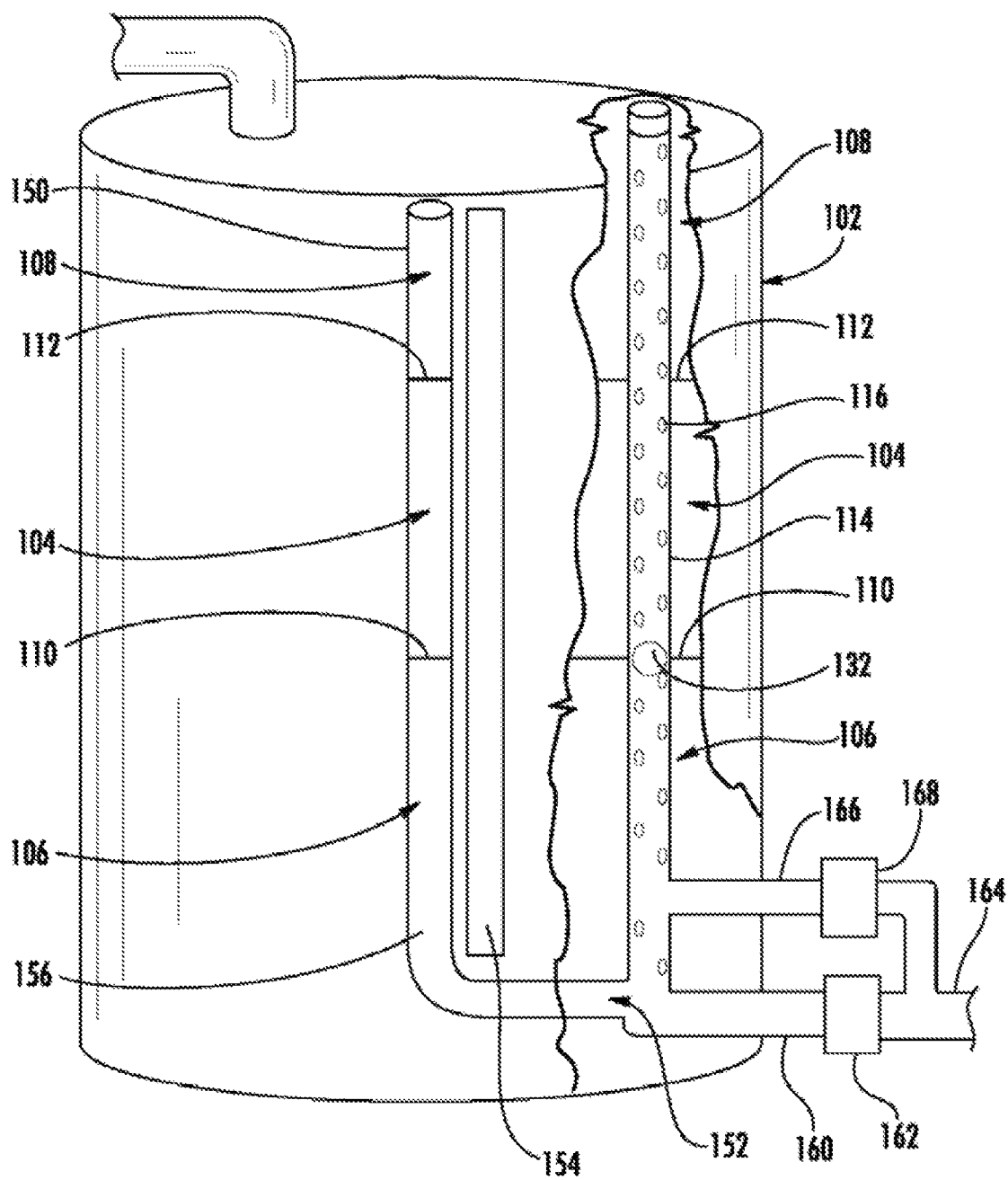
FIG. 3 shows another embodiment of a fluid separation device in accordance with some embodiments of the present disclosure.

FIG. 3 illustrates another exemplary embodiment of the fluid separation device 100. The container 102 is configured to contain the first liquid 104, the second liquid 106, and the gas 108. The float member 132 is configured to float at the first interface 110 between the first liquid 104 and the second liquid 106. A sight tube 150 is configured to be in fluid communication through an entry portion 156 with the interior 118 of the retention member 114, such that the user can see a top level of the second liquid 106, i.e., the first interface 110 between the first liquid 104 and the second liquid 106, and a top level of the first liquid 104, i.e., the second interface 112 between the first liquid 104 and the gas 108. The sight tube 150 can be configured to be outside of the interior 120 of the container 102. Of course, the sight tube 150 may be configured so the user can see only the level of the second liquid 106 or only the level of the first liquid 104.

The first liquid 104 and second liquid 106 may enter the sight tube 150 through a sight tube aperture 152 or sight tube apertures 152 in fluid communication with the retention member 114. The sight tube aperture 152 may be configured to prevent the float member 132 from closing the sight tube aperture 152 or passing into the sight tube aperture 152. For example, the sight tube aperture 152 may extend from the retention member 114 in a substantially horizontal direction and the sight tube aperture 152 may be sized so that the retention member 114 does not go into the sight tube aperture 152 or occlude the sight tube aperture 152. A light source 154 may be configured to shine on the sight tube 150, so that the user can see the one level or both levels.

Alternatively, an interior of the sight tube 150 may be configured to retain the float member 132. In this embodiment, the sight tube essentially functions as the retention member 114. The float member 132 floats in contacting adjacency to the first interface 110 between the first liquid 104 and the second liquid 106, and as the second liquid 106 is pulled from the container 102, the float member 132 moves down to the predetermined level after which the second liquid 106 cannot be substantially pulled from the container 102.

A second fluid output line 160 may have a second fluid valve 162 that may be configured to open or close as needed to permit flow of the second liquid 106 into a primary output line 164. Even without the float member 132 being seen, once the user is no longer able to pull the second liquid 106 from the container 102, the user may elect to open a first fluid valve 168 that may be configured to open or close as needed to permit flow of the first liquid 104 from a first fluid output line 166 into the primary output line 164.

Besides the user seeing that the second liquid 106 can no longer be pulled from the container 102 as an indication to start pulling the first liquid 104, wired or wireless connections between the float member 132 and one or more of the valves 162, 168 may be used to control what fluids may be pulled from the container 102. For example, the float member 132 in position to occlude flow of the second liquid 106 may create an electromechanical connection to close the second fluid valve 162. In addition, the electromechanical connection could automatically open the first fluid valve 168 or electromechanical connection could permit the user to open the first fluid valve 168, whereas without the electromechanical connection the user could not open the first fluid valve 168.

Figure 4A:
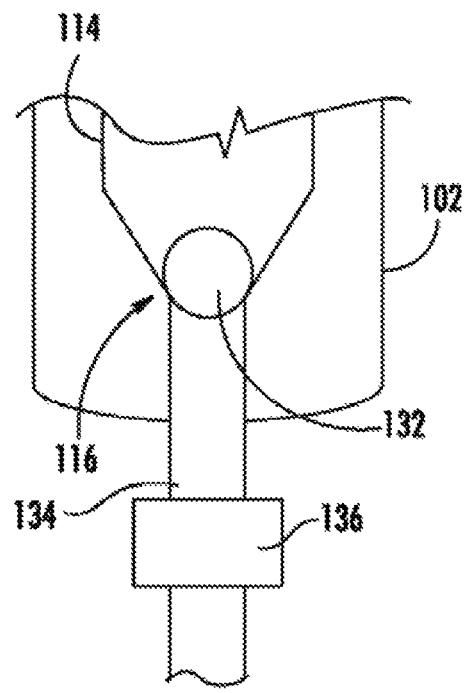
FIGS. 4A-D shows several embodiments of a float member in relation to the container in accordance with the present disclosure
Figure 4B:
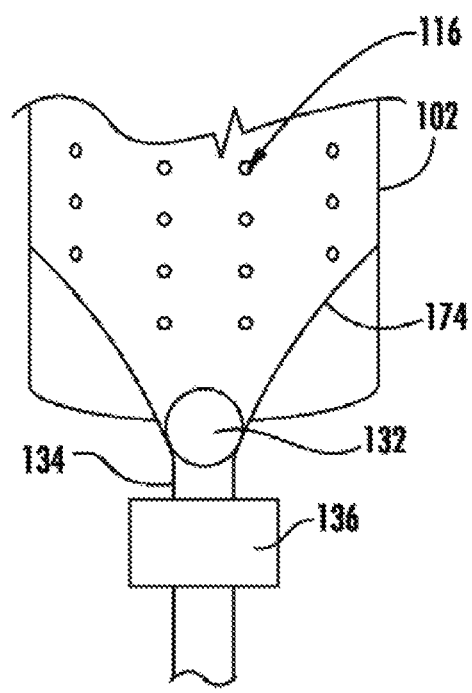
Figure 4C:
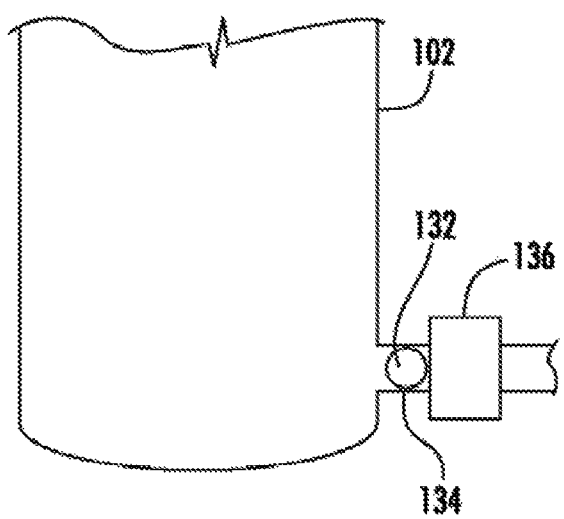
Figure 4D:
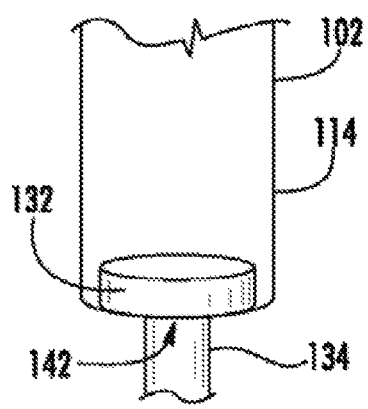

FIGS. 4A-D demonstrates further embodiments of the float member 132 in relation to the container 102, the retention member 114, and the output line 134. FIG. 4A shows the output line 134 may be at the bottom of the container 102. In addition, this embodiment shows the fluid separation device 100 may have one aperture 116 and not a plurality of apertures 116. FIG. 4B shows the retention member 114 may extend outside of the container 102. In addition, this embodiment shows the retention member 114 may have surfaces 174 that are substantially nonparallel. In other embodiments, the surfaces 174 of the retention member 114 may be substantially parallel, e.g., the surfaces 174 may be parallel in the retention member 114 that is a cylinder. FIG. 4C demonstrates the retention member 114 may be configured to permit the float member 132 to go outside the conventional boundaries of the container 102 into the output line 134. The output line 134 may have a sight box so that if the retention member 114 is configured to permit the float member 132 to go into the first output line, the float member 132 may be seen by the user. FIG. 4D shows the float member 132 occlude fluid communication between the interior 118 of the retention member 114 and the output line 134 at the outlet aperture 142 without actually having to protrude into the outlet aperture 142. Other embodiments are contemplated that may keep within the spirit of the present disclosure.

Figure 5:
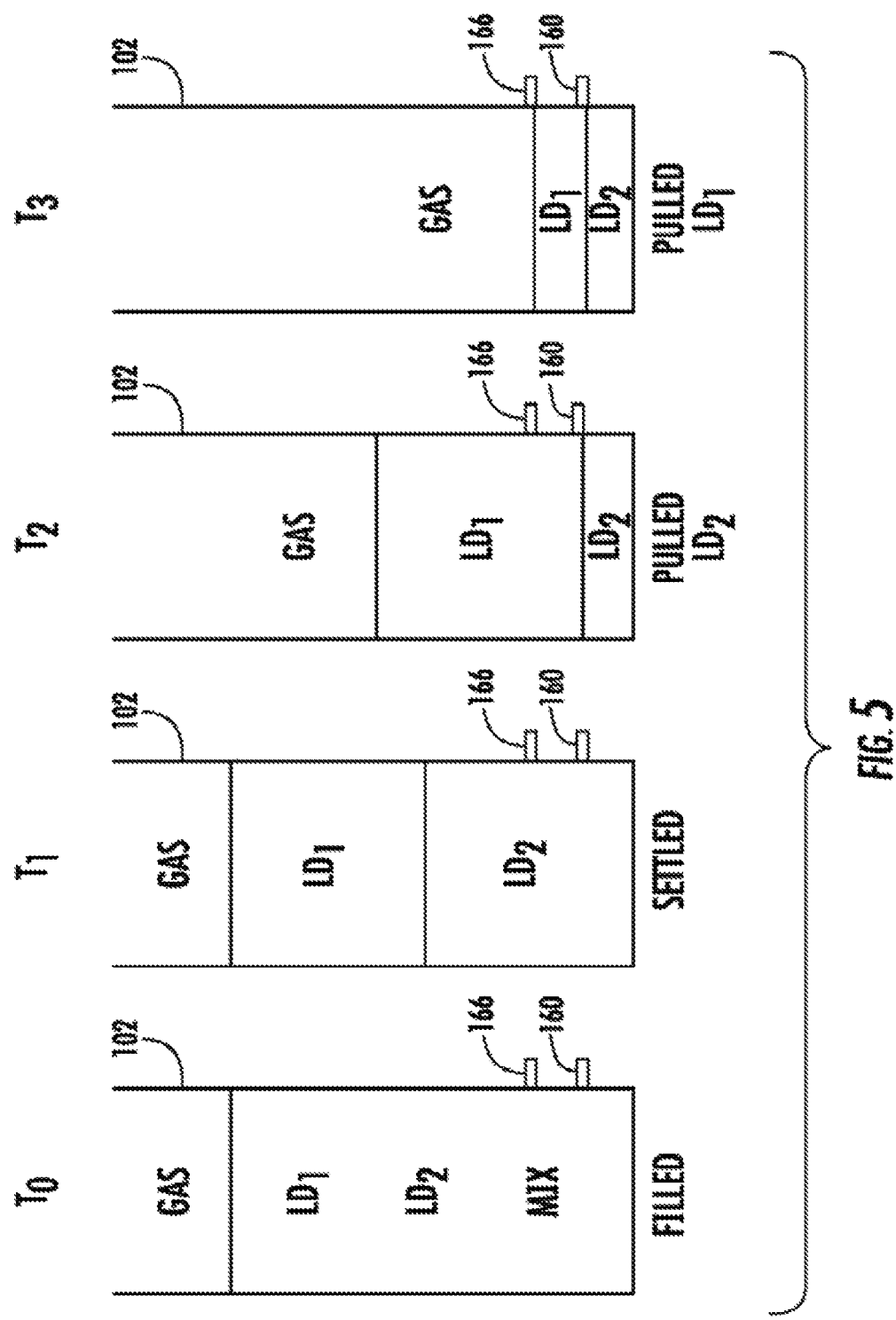
FIG. 5 shows four different times in the use of a fluid separation device in accordance with some embodiments of the present disclosure.

FIG. 5 shows the fluid separation device 100 in operation over time. At time T0, the container 102 is filled with the first liquid 104 (LD1), the second liquid 106 (LD2), and the gas 108. While the gas 108 may quickly float to the top in relation to the separation of the first liquid 104 and the second liquid 106, the first liquid 104 and the second liquid 106 may be present as a mixture for some period of time. At some later time T1, the first liquid 104 and the second liquid 106 will be settled, such that the first liquid 104, which is less dense than the second liquid 106, floats on top of the second liquid 106. The separation may occur passively or actively through use of any suitable apparatus or method. After the first liquid 104 and the second liquid 106 have substantially separated until time T2, the second liquid 106 can be pulled from the container 102 through the second fluid output line 160. The second liquid 106 can be pulled from the container 102 until the float member 132 closes the fluid communication between the container 102 and the second fluid output line 160, such that the second liquid 106 can no longer be pulled from the container 102. After the second liquid 106 has been pulled from the container 102 until time T3, the first liquid 104 can be pulled from the container 102 through the first fluid output line 166. The first liquid 104 can be pulled from the container 102 until the fluid level of the first liquid 104 is at, or slightly below, the first fluid output line 166, so there is no longer fluid communication of the first liquid 104 with the first fluid output line 166. Time T0 occurs before time T1. Time T1 occurs before time T2. Time T2 occurs before time T3.

Figure 6:
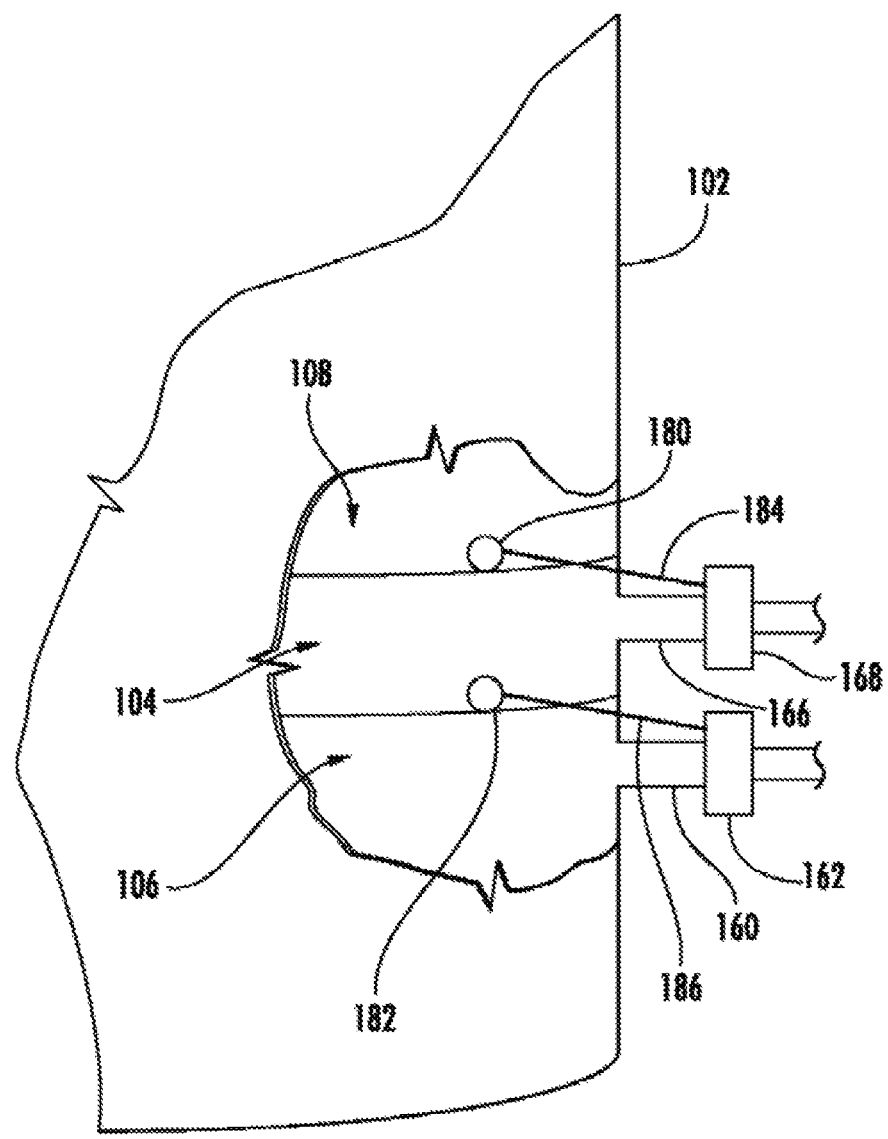
FIG. 6 shows yet another embodiment of a fluid separation device in accordance with some embodiments of the present disclosure.

FIG. 6 demonstrates the fluid separation device 100 may have a first float member 180 and a second float member 182. The first float member 180 may be configured to have a density less than the first liquid 104. The second float member 182 may be configured to have a density less than the second liquid 106. The first float member 180 may be configured to open or close the first fluid valve 168 to substantially permit or substantially impede flow of the first liquid 104 through the first fluid output line 166. The second float member 182 may be configured to open or close the second fluid valve 162 to substantially permit or substantially impede flow of the second liquid 106 through the second fluid output line 160. The first float member 180 may be coupled to the first fluid valve 168 by a first connection 184, such as a wire, or wirelessly. The second float member 182 may be coupled to the second fluid valve 162 by a second connection 186, such as a wire, or wirelessly. The first float member 180 may be coupled to the first fluid valve 168 wirelessly, and the second float member 182 may be coupled to the second fluid valve 162 physically, or vice versa. In this way, the first fluid valve 168 or the second fluid valve 162 or both the first fluid valve 168 and the second fluid valve 162 may be opened or closed without the user seeing the fluid in the container 102 or any of the output lines 160, 166.

As shown in FIG. 6, it might be possible to remove the first liquid 104 and the second liquid 106 at the same time, i.e. simultaneously, through two separate liquid output lines. In addition, it might be possible to remove the first liquid 104 without removing the second liquid 106 at the same time, i.e. simultaneously. The second liquid 106 could be removed after all or some of the available first liquid 104 has been removed. Of course, it might be possible to remove the second liquid 106, and then remove the first liquid 104.

Figure 7:
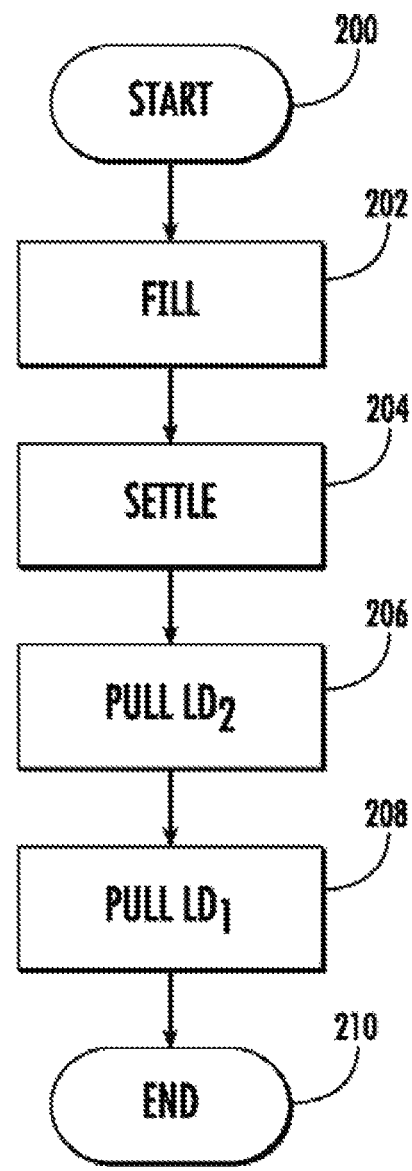
FIG. 7 is a flow chart for separation of fluids in accordance with some embodiments of the present disclosure.

FIG. 7 shows a method of using the fluid separation device 100. The method shown as exemplary and is not required. Steps may be optional. Further steps may be added to this method.

The method of using the liquid separation device starts at step 200.

At step 202, the first liquid 104, the second liquid 106, and the gas 108 are filled in the container 102. The filling process may take minutes, hours, days, or weeks, or other suitable time frame. The filling process may be continuous or intermittent.

By step 204, the liquids 104, 106 and the gas 108 of different densities have settled such that the less dense, i.e., lighter, densities float on top of the more dense, i.e., heavier, densities. The settling of the first liquid 104, the second liquid 106, and the gas 108 may occur simultaneously during filling of the container 102 with the first liquid 104, the second liquid 106, or the gas 108. The settling of the first liquid 104, the second liquid 106, and the gas 108 may occur when the container 102 is not being filled with the first liquid 104, the second liquid 106, or the gas 108.

In step 206, the second liquid 106 on the bottom of the container 102 is removed or pulled from the container 102. At a predetermined level as determined by the configuration of the fluid separation device 100, the fluid communication between the retention member 114 and the output line 134 is substantially closed. Then, there is no more removal of the second liquid 106 from the container 102. The user may stop the removal before the predetermined level is reached, e.g., by closing a valve.

Then, at step 208, the first liquid 104 is removed or pulled from the container 102. The first liquid 104 may be removed from the container 102 until fluid communication between the retention member 114 and the output line 134 for the first liquid 104 is lost due to removal of the first liquid 104.

At step 210, the method ends.

Figure 8:
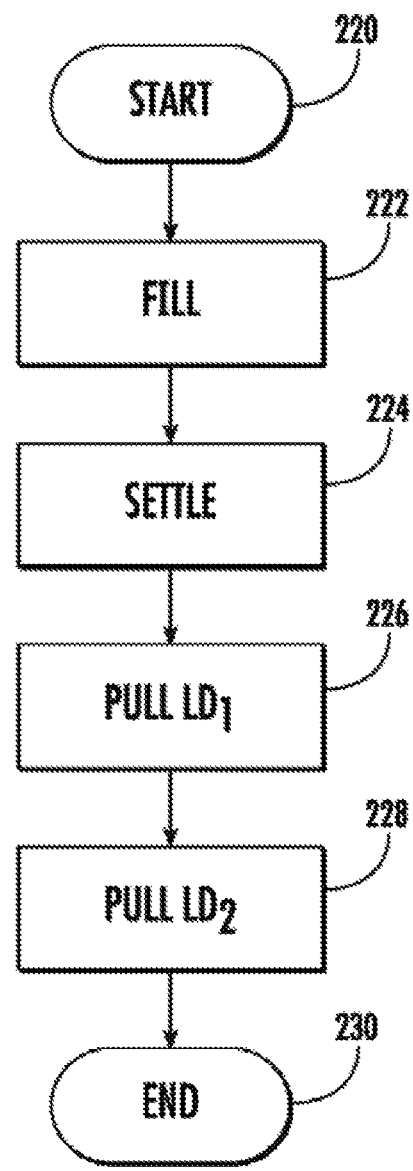
FIG. 8 is a flow chart for separation of fluids in accordance with some embodiments of the present disclosure.

FIG. 8 shows a method of using the fluid separation device 100. The method shown as exemplary and is not required. Steps may be optional. Further steps may be added to this method.

The method of using the liquid separation device starts at step 220.

At step 222, the first liquid 104, the second liquid 106, and the gas 108 are filled in the container 102. The filling process may take minutes, hours, days, or weeks, or other suitable time frame. The settling of the first liquid 104, the second liquid 106, and the gas 108 may occur simultaneously during filling of the container 102 with the first liquid 104, the second liquid 106, or the gas 108. The settling of the first liquid 104, the second liquid 106, and the gas 108 may occur when the container 102 is not being filled with the first liquid 104, the second liquid 106, or the gas 108.

By step 224, the liquids 104, 106 and the gas 108 of different densities have settled such that the less dense, i.e., lighter, densities float on top of the more dense, i.e., heavier, densities. The settling of the first liquid 104, the second liquid 106, and the gas 108 may occur simultaneously during filling of the container 102 with the first liquid 104, the second liquid 106, or the gas 108. The settling of the first liquid 104, the second liquid 106, and the gas 108 may occur when the container 102 is not being filled with the first liquid 104, the second liquid 106, or the gas 108.

In step 226, the first liquid 104 in the container 102 is removed or pulled from the container 102 through the output line 134 until the fluid communication is closed at a predetermined level. Then, there is no more removal of the first liquid 104 from the container 102. The user may stop the removal of the first liquid 104 before the predetermined level is reached, e.g., by closing a valve.

Then, at step 228, the second liquid 106 is removed or pulled from the container 102. The second liquid 106 may be removed from the container 102 until fluid communication between the retention member 114 and the output line 134 for the second liquid 106 is closed or lost.

At step 230, the method ends.

In overview, the fluid separation device may include a retention member with a plurality of apertures and a float member in a container. The retention member may extend up to substantially the height of the container in which the liquid separation device is positioned, or the retention member may be taller or shorter than the height of the container. A float member is disposed in the interior of the retention member. The interior of the retention member is in fluid communication with the container. The density of the float member is chosen to be less than the density of the more dense liquid in the container, e.g., H2O, and more dense than the less dense liquid, e.g., oil, such that float member freely travels or floats on the more dense liquid. In so doing, liquid in the retention member below the float member is the more dense liquid, and the more dense liquid can be drawn from the container. Similarly, fluid in the retention member above the float member is the less dense fluid, and the less dense fluid can be drawn off from the container. In this situation, the float member could rest in a reducing swage while the less dense fluid exits the container.

The device may include at least two exits, or output lines, through the side of the container. The less dense fluid can exit through the upper exit line and the more dense fluid can exit through at least the lower exit line. A light can shine on the fluid so that the fluid can be monitored.

The top of the retention member may be removably enclosed with a cover that may be removed to allow the retention member to be changed after excessive wear to the float member has occurred or the user desires to change the characteristics of the float member. The bottom of the retention member may have the reducing swage designed to reversibly capture the retention member after the more dense fluid level has dropped below the apertures thereby blocking the more dense fluid opening, but the swage may also release the float member once the more dense fluid level has risen above the aperture again. A top valve may be used to remove the less dense fluid from the container. The less dense fluid can be pulled from the container after the more dense fluid has been evacuated, for example by a pump truck from a PCC pot, when the float member has rested in the swage. A bottom valve may be used to remove the more dense fluid from the container.

A first float and a second float may open or close a top valve and a bottom valve, respectively. The density of first float and the density of second float may be the same or different. As with the other embodiments, the valves may be opened manually or automatically depending on the disposition of the ball or the float.

The whole device or parts of the device may be treated with an appropriate coating, such as Xylan® coating material, for use in both H2S, saltwater, and other environments. Whitford Corporation, 47 Park Avenue, Elverson, Pa. 19520 is source for Xylan® coating material. Xylan is a trademark owned by its owner.

Further embodiments are envisioned.

FIGS. 9-13 shows an embodiment of the fluid separation device 100. The container 102 is sized to contain an appropriate amount of the first liquid 104, the second liquid 106, and the gas 108. The output line 134 is in fluid communication with the interior 118 of the retention member 114, such that when the valve 136 is opened by a manual valve control 137 there may be flow of the first liquid 104 or the second liquid 106 out of the container 102 through the output line 134 to the output station.

In the embodiment shown in FIG. 9, the retention member 114 may have one or more of the apertures 116, as shown previously. Or, the retention member 114 may be formed from rods as further shown in FIGS. 9B-C. The closure device 130 is not shown in FIG. 9A, although it may be present as shown in other embodiments.

The retention member 114 is configured so that the float member 132 may freely float up and down with change in the first interface 110, which is at substantially the top level of the second liquid 106. When the amount or level of the second liquid 106 decreases to a predetermined level, the float member 132 substantially engages a seating 133 to substantially occlude flow of the second liquid 106 through the output line 134. The first liquid 104 may be removed from the container 102 through another output line.

In an embodiment, the retention member 114 may be formed from a first rod 115, a second rod 117, a third rod 119, and a fourth rod 121, as shown in FIG. 9B, in a substantially rectangular arrangement. The rectangular arrangement may be substantially a square arrangement. Each one of the 4 rods may be in a substantially parallel alignment with respect to each other. Each rod may be substantially perpendicular to the seating 133.

In an embodiment, the retention member 114 may be formed from the first rod 115, the second rod 117, and the third rod 119, as shown in FIG. 9C, in a substantially triangular arrangement. The triangular arrangement may be substantially an equilateral triangle arrangement in which all 3 sides are equal. Each one of the 3 rods may be in a substantially parallel alignment with respect to each other. Each rod may be substantially perpendicular to the seating 133.

In FIGS. 9B-C, the float member 132 is shown substantially as a cylinder with a substantially circular cross section. This confirmation may slide freely within the retention member 114, although other shapes, such as rectangular, are envisioned.

Greater than 3 or 4 rod arrangements are contemplated. The rod arrangements embodiments may be used in conjunction with the aperture 116 embodiments. The rods may be made of any suitable material, such as metal, polymer, etc. or combination thereof.

Dirt or sludge from the first liquid 104, the second liquid 106, and other particles in the environment may impede the ability of the float member 132 to slide freely within the retention member 114. The dirt or sludge may affect friction experienced in the system. More dirt or sludge may increase friction and therefore decrease motion of one object relative to another for a given force. The float member 132 and the retention member 114 may be sized and shaped as needed, such that the float member 132 may slide within the retention member 114 with the rise and fall of the liquids 104, 106 within the container 102.

Figure 10:
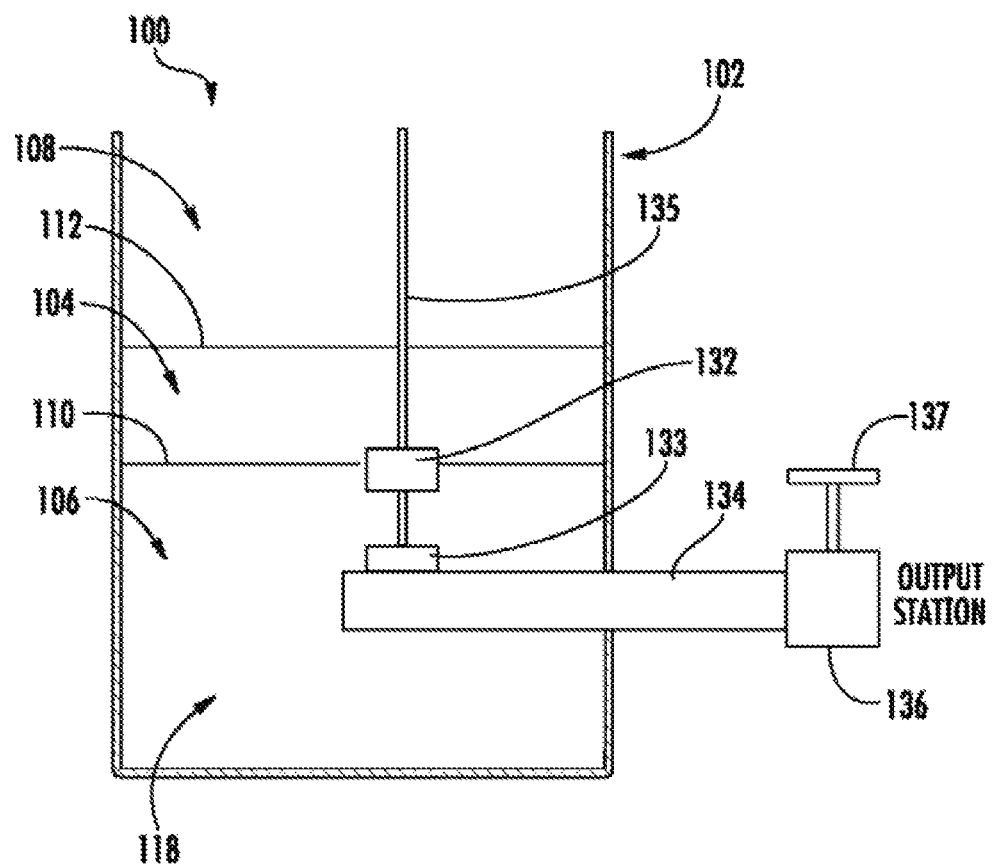
FIG. 10 shows another embodiment of a fluid separation device in accordance with some embodiments of the present disclosure.

In the embodiment shown in FIG. 10, a rod 135 may be configured to be substantially perpendicular to the seating 133. The rod 135 is substantially fixed in relation to the seating 133. The rod may be affixed to the seating 133 itself, the container 102, or other suitable structure, such that the rod 135 is substantially fixed in relation to the seating 133. When the second liquid 106 is removed to a predetermined level, the float member 132 engages the seating 133 to substantially occlude flow of the second liquid 106 through the seating 133 into the output line 134. The seating 133 may have appropriate apertures for the fluid communication between the interior 118 and the output line 134.

The float member 132 may be configured to have an appropriate aperture to encircle the rod 135, such that the float member 132 may rise and fall on the rod 135 with the corresponding rise and fall of the first interface 110. The aperture (not shown) in the float member 132 may be substantially circular to correspond with a substantially circular cross section shape of the rod 135. Dirt or sludge from the first liquid, 104, the second liquid 106, or other particles in the environment may impede the ability of the float member 132 to slide freely along the rod 135 with the rise and fall of the liquids 104, 106, within the container 102.

The float member 132 and the rod 114 may be sized and shaped as needed, such that the float member 132 may slide freely along the rod 135 with the rise and fall of the liquids 104, 106 within the container 102. More than one rod 135 may be used, however the greater number of rods 135 may increase the surface area between the rods 135 and the float 132 that is susceptible to dirt or sludge that may impede the ability of the float member 132 to slide freely.

Figure 11:
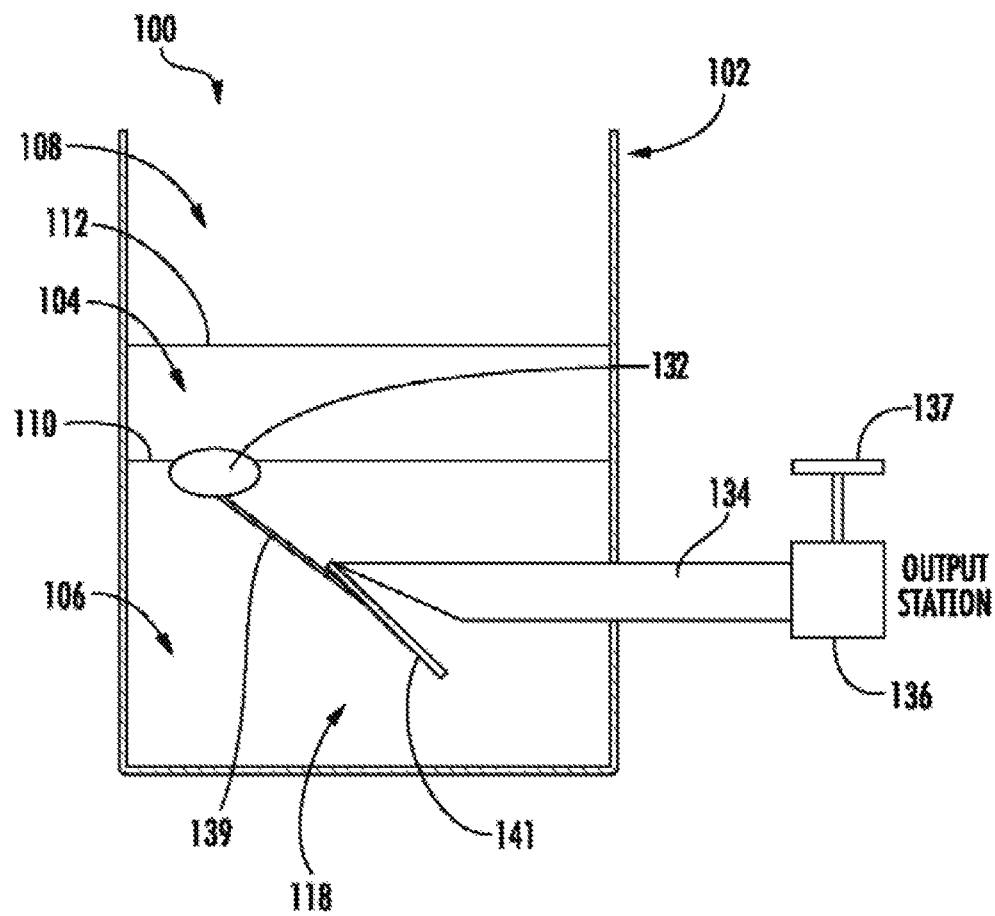
FIG. 11 shows another embodiment of a fluid separation device in accordance with some embodiments of the present disclosure.

In the embodiment shown in FIG. 11, a gate 141 is configured to transition from a first position that substantially permits fluid communication from the interior 118 to the output station, and a second position that substantially impedes fluid communication from the interior 118 to the output station. The first position is shown in FIG. 11. The first position may be known as an open position. The second position is not shown, and it may be known as the closed position.

The transition from the first position to the second position occurs with change in the interface 110. The rising level of the first interface 110 in relation to the bottom of the container 102 further opens the gate 141. The falling level of the first interface 110 in relation to the bottom of the container 102 further closes the gate 141. Eventually, the transition to the closed position that substantially impedes fluid communication from the interior 118 to the output station is achieved. The float member 132 rises and falls with the rising and falling of the first interface 110. A coupling member 139 couples the float member 132 to the gate 141, such that the rising and falling of the float member 132 transitions the gate 141 from the open position to the closed position. This configuration may be known as an inverted gate.

Figure 12:
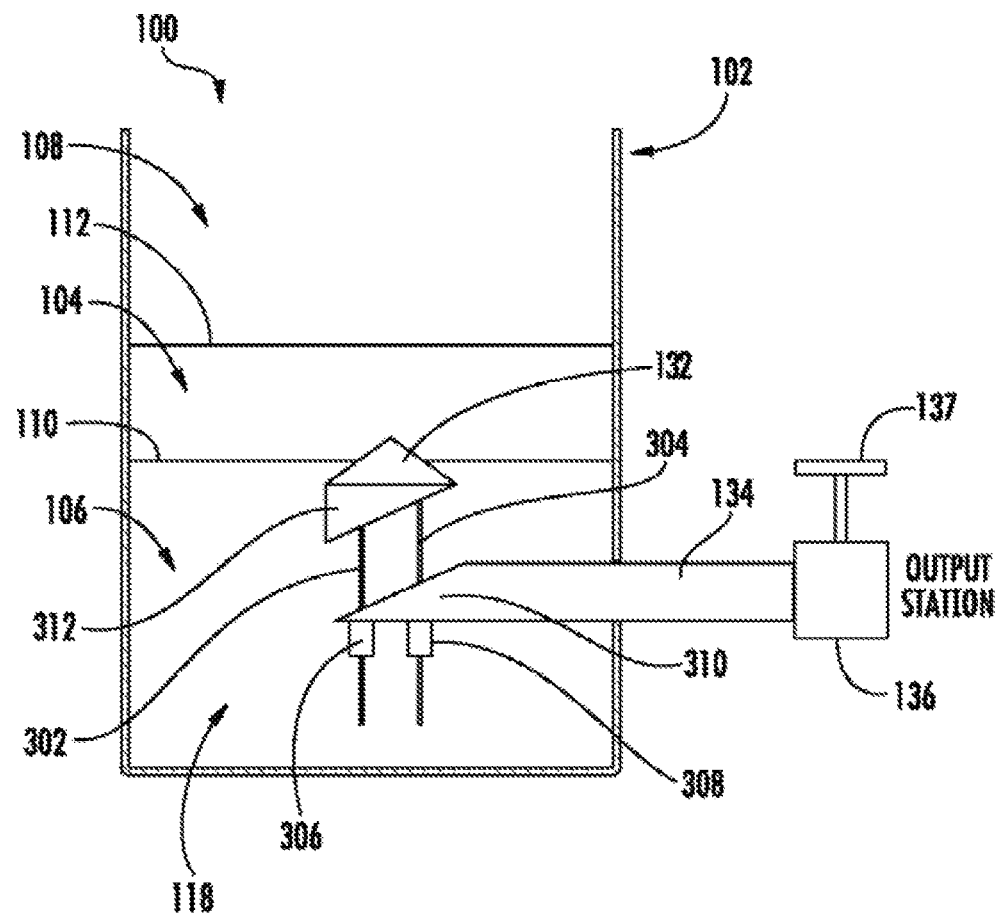
FIG. 12 shows another embodiment of a fluid separation device in accordance with some embodiments of the present disclosure.

In the embodiment shown in FIG. 12, the float member 132 may be coupled to a seating member 310 through one or more connection members. A first connection member 302 and a second connection member 304 are shown, however one or more than to connection members are contemplated. The float member 132 is shown to have an angled triangular portion 312 that is configured to mate with the seating member 310, such that when the angled triangular portion 312 couples to the seating member 310, fluid communication from the interior 118 to the output station is substantially occluded. The first connection member 302 and the second connection member 304 may be coupled to the seating member 310 by a first coupling member 306 and a second coupling member 308, respectively. As with other embodiments disclosed the sliding mechanism may be affected by dirt or sludge. Corrosion may also reduce the slight ability in any of the sliding mechanisms disclosed.

The float member 132 is configured to transition from a first position that substantially permits fluid communication from the interior 118 to the output station, and a second position that substantially impedes fluid communication from the interior 118 to the output station. The first position is shown in FIG. 12. The first position may be known as an open position. The second position is not shown, and it may be known as the closed position.

Figure 13:
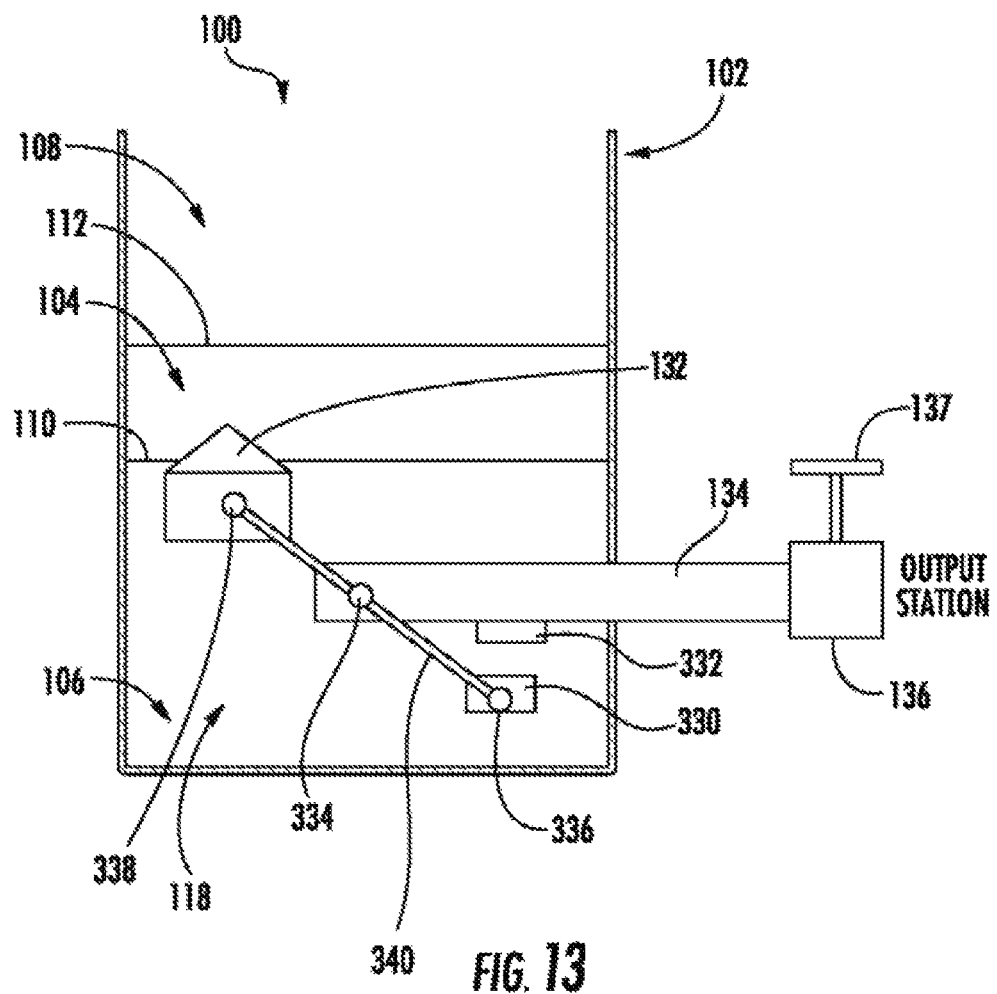
FIG. 13 shows another embodiment of a fluid separation device in accordance with some embodiments of the present disclosure.

In the embodiment shown in FIG. 13, the float member 132 is coupled to a seat plug 330 through a coupling member 340. The coupling member 340 is configured to rotate about an axis of a coupler 334 responsive to movement of the float member 132 up and down that in itself is responsive to the rising and falling level of the first interface 110 in relation to the bottom of the container 102. The float member 132 is coupled to the coupling member 340 through a float member coupling member 338, such that the orientation of the float member 132 can be optimized, as needed, to facilitate rising and falling of the float member responsive to rising and falling of the interface 110. The float member 132 may rotate about an axis of the float member coupling member 338. The seat plug 330 is coupled to the coupling member 340 through a seat plug coupling member 336, such that the orientation of the seat plug 336 can be optimized, as needed, to engage and disengage a seating member 332. The seat plug 330 may rotate about an axis of the seat plug coupling member 336.

The seat plug 336 is configured to transition from a first position that substantially permits fluid communication from the interior 110 to the output station and a second position that substantially impedes fluid communication from the interior 110 to the output station. The first position is shown in FIG. 13. The first position may be known as an open position. The second position is not shown, and it may be known as the closed position.

The rotatory joints may function better than sliding joints disclosed. However, the rotatory joints may still be susceptible to dirt, sludge, and corrosion.

The American Petroleum Institute gravity, or API gravity, is a measure of how light or heavy a petroleum liquid is compared to water. If the API gravity of the petroleum liquid is greater than 10, then the petroleum liquid is lighter than water and the petroleum liquid floats on water. If the API gravity of the petroleum liquid is less than 10, than the petroleum liquid is heavier than water and the petroleum liquid sinks under water. So, the API gravity is an inverse measure of the density of the petroleum liquid in relation to the density of water. The API gravity measurement is used to compare densities of petroleum liquids. For reference, specific gravity is the ratio of the density of a substance to the density of a reference substance. Specific gravity is hello did you have fun Co. I'm not aware of the term complete specification there's provisional and non-provisional that means that you cured just putting something on file at the United States patent and trademark office but you are not going to turn it that document itself into a patent application for which claims issue and non-provisional was one from which claims issue the provisional connective the priority date that a non-provisional document claims priority to wiped set come up ITS PTO mean USPTO a cuff occur the ratio of the mass of a substance to the mass of a reference substance for the same given volume. The reference substance is typically water at 4° C. for liquids.

The formula to calculate API gravity from Specific Gravity (SG) is:

$$APIgravity = \frac{141.5}{SG} - 131.5 \quad (1)$$

Conversely, the SG of the petroleum liquid can be derived from the API gravity of the petroleum liquid according to the following formula:

$$SGGat60° = \frac{141.5}{APIgravity + 131.5} \quad (2)$$

The API gravity of the petroleum liquid, i.e., the first liquid 104, on which the fluid separation device 100 will be used can be accounted for in the selection of the density of the float member 132. Further, the API gravity of the wastewater, i.e. the second liquid 106, on which the fluid separation device 100 will be used can be accounted for in the selection of the density of 10 the float member 132. For example, in a first location, e.g., Texas, the API gravity of a first petroleum liquid may be a first value; in a second location, e.g., North Dakota, the API gravity of a second petroleum liquid may have a second value; in a third location, e.g., Alberta, the API gravity of a third petroleum liquid may have a third value; in a fourth location, e.g., Brazil, the API gravity of a fourth petroleum liquid may have a fourth value; and in a fifth location, e.g., Saudi Arabia, the API gravity of a fifth petroleum liquid may have a fifth value. See Table 1:

| Location | Geo-position | Petroleum liquid API gravity |
|---|---|---|
| 1 | Texas | First value, e.g., 14.1 |
| 2 | North Dakota | Second value, e.g., 15.7 |
| 3 | Alberta | Third value, e.g., 13.0 |
| 4 | Brazil | Fourth value, e.g., 17.7 |
| 5 | Saudi Arabia | Fifth value, e.g., 11.1 |

The values in Table 1 are merely exemplary and not limiting. The geo-positions and values are provided to form a concrete point of discussion hereinbelow.

In this exemplary situation, the fluid separation device 100 disclosed herein r ray be able to more easily separate the petroleum liquid in Brazil from water than in Saudi Arabia, due to the higher API gravity of petroleum liquid in Brazil relative to Saudi Arabia and due to the closeness of the petroleum liquid API gravity of Saudi Arabia to the 10 API gravity of water. The petroleum liquid in Brazil may more easily separate from the wastewater than the petroleum liquid in Saudi Arabia does.

The API gravity of the petroleum liquid on which the fluid separation device 100 will operate can be accounted for in the selection. The SG, or the effective API gravity, of the float member 132 could be accounted for during the selection process by taking into account the petroleum liquid in which the float member 132 will operate. For example, the float member 132 with an effective API gravity of 13.0 may not operate effectively in the petroleum liquid in Alberta for fluid separation, the float member 132 with an effective API gravity of 13.0 will not work at all in Saudi Arabia for fluid separation, and the float member 132 with an effective API gravity of 13.0 may operate efficiently (e.g., quick separation time) Brazil. Again, geo-positions and values are provided to form a concrete point of discussion and are merely exemplary and not limiting and the petroleum liquid API gravity values may not apply to the geo-positions identified.

In certain embodiments, the petroleum liquid has an API gravity of about 11 or greater; about 12 or greater; about 13 or greater; about 14 or greater; about 15 or greater; about 16 or greater; about 17 or greater; about 18 or greater; about 19 or greater; about 20 or greater; about 21 or greater; about 22 or greater; about 23 or greater; about 24 or greater; about 25 or greater; about 26 or greater; about 27 or greater; about 2.8 or greater; about 29 or greater; about 30 or greater; about 31 or greater; about 32 or greater; about 33 or greater; about 34 or greater; about 35 or greater; about 36 or greater; about 37 or greater; about 38 or greater; about 39 or greater; about 40 or greater; about 41 or greater; about 42 or greater; about 43 or greater; about 44 or greater; about 45 or greater; about 46 or greater; about 47 or greater; about 48 or greater; about 49 or greater; about 50 or greater.

Actual values of API gravity may be found through a variety of sources. For example, see U.S. energy information administration at http://www.eia.gov/todayinenergy/detail-.cfm?id=7110 (last visited Oct. 29, 2015), which is herein incorporated by reference in its entirety. The original publication date is Jul. 16, 2012, The page was re-published Jun. 26, 2013 when the map was corrected. Table on this webpage shows a range of API gravity with Mexico-Maya being among the heaviest of the crude oils shown and Algeria-Sahara blend being among the lightest of the crude oils shown.

Just as the API gravity of the petroleum liquid can vary between geo-positions, the actual API gravity of wastewater can vary between geo-positions. The actual API gravity of wastewater can be determined by measurement. The actual API gravity of wastewater, also known as brine water, may be 10, approximately 10, substantially lower than 10, or substantially greater than 10. The effective API gravity of the float member 132 could be chosen based on the API gravity of the wastewater in a given geo-position. For example, if the actual API gravity of wastewater is 12, than the effective API gravity of the float member 132 can be chosen to be higher than 12 and lower than the API gravity of the petroleum liquid in which the float member 132 will operate.

Further, the operator may need to account for the fluid pressure experienced by the float member 132 in order to increase the chances that the float member 132 will rise and fall with the first interface 110. For example, a float member at a depth of 10 feet in the first liquid 104 can be calculated to experience a certain pressure that is proportionate to the depth multiplied by the API gravity of the petroleum liquid. If the pressure experienced by the float member 132 from the first liquid 104 is not above a certain threshold, the float member 132 might float in the first liquid 104 only, rather than at the first interface and in both the first liquid 104 and the second liquid 106. While any size container is contemplated, common oil tank heights are 15 feet and 20 feet. For this reason, a predetermined height for occlusion by the float member 132 to substantially impede flow of the second liquid 106 out of the container 102 might be calculated as follows so that the float member 132 is located at the first interface 110:

Of course, the APA gravity of the first liquid 104 and the second liquid 106 may be inhomogeneous, and an operator of the fluid separation device 100 can account for the inhomogeneity during selection of the float member 132.

If the characteristics of the first liquid 104 and the second liquid 106 change after a first operation, then the bobber 132 may be changed from a first specification to a second specification to account for the characteristics of the first liquid 104 and the second liquid 106 that will be, or are expected to be, present during a second operation. The change in the bobber 132 may be performed by swapping out a first bobber 132 for a second, different bobber 132. Or the bobber 132 may itself be adjusted, by for example having a port in the bobber 132 in which material, such as sand, can be added or removed to change the specific gravity of the bobber 132.

A pumper is responsible for monitoring a well site, including monitoring the container 102 and its contents. An embodiment of the present disclosure may promote accountability by pumper to monitor the first liquid 104 and the second liquid 106, such as oil and water, respectively. First, the pumper can color cut the contents of the container 102 before calling for a driver of a water truck to remove water from the container 102. The color cutting is performed by putting a water finding paste on a gauge line (e.g., metal measuring tape), then putting the gauge line into the liquid in the container 102 starting above the water line, such as by putting the gauge line into the liquid from the top of container 102. The gauge line might enter the container 102 through a hatch that can be opened and closed. The paste will remain white in oil but turn purple in water.

In some situations in which the embodiments disclosed are used, in order to gauge liquid levels of the tank 102, one must first climb to an opening hatch at the top of the tank 102. The second step in the process would be to squeeze a small amount of paste on a gauge stick or line gauge within a few inches of the depth perceived to be where the oil-water interphase is likely to exist based on previous gauge recordings, such as the previous days gauges. The third step to occur would be to lower the gauge line into the tank 102 until it has touched the bottom of the tank 102. After waiting a few seconds, one would then reel the gauge back in looking for a change in color of the paste which would indicate the presence of water from that point and anything below. For the portion of the gauge that is wet and did not change in color, it would be implied that that portion of the gauge was in oil, not water. Examples of paste that could be used in this operation are Gasolia® water finding paste (Gasolia is a division of federal process corporation) and Sar-Gel® water finding paste (Sartomer). (Trademarks are owned by their respective owners.)

Second, the pumper can call for a water truck when the amount of oil in the container is not so significant that the driver of the water truck cannot attain a full or substantially full load of water in the water truck when the driver comes to draw water from the container 102. By color cutting, the pumper can promote efficiency in managing the contents of the container 102, because the driver would not be called before there is enough water to remove from the container 102.

To continue with this discussion of accountability, if the ratio of oil to water in the container 102 has increased so substantially that there is a large amount of oil in the water tank and the pumper did not color cut the contents to determine that the driver of the water truck will be able to attain a full or substantially full load of water in the water truck, then the driver will be unable to achieve a full or substantially full load due to the container 102 only having a small amount of water to haul. The oil will remain stored safely due to the apparatus and method that may prevent pulling oil out of the container 102 by the driver of the water truck.

Further, the pumper may be able to recognize that the pumper is "gaining" more oil in the container 102 after each removal of water in the water truck by the pumper recognizing that there is less space in the container 102 for liquid to be added to the container 102. This "gain" of oil by using the apparatus and method disclosed herein is in comparison to a water removal system that does not limit the removal of oil from the container 102. Further, the pumper may notice that the amount of fluid being hauled by the water truck has declined or is declining in volume per unit of time, such as per day, per week, etc. The "gain" in oil in the container 102 or the decline in fluid being removed by the water truck may be passive indicators that the apparatus and method of the present disclosure is working as intended.

In some situations in which the embodiments disclosed are used, in order to gauge liquid levels of the tank 102, one must first climb to an opening hatch at the top of the tank 102. The second step in the process would be to squeeze a small amount of paste on a gauge stick or line gauge within a few inches of the depth perceived to be where the oil-water interphase is likely to exist based on previous gauge recordings, such as the previous days gauges. The third step to occur would be to lower the gauge line into the tank 102 until it has touched the bottom of the tank 102. After waiting a few seconds, one would then reel the gauge back in looking for a change in color of the paste which would indicate the presence of water from that point and anything below. For the portion of the gauge that is wet and did not change in color, it would be implied that that portion of the gauge was in oil, not water.

So far, the fluid separation device 100 disclosed may be considered a mechanical system that relies upon physical principles in which removal of the second liquid 106 from the container 102 lowers the fluid level of the first interface 110 between the first liquid 104 and the second liquid 106 so that the operator removing liquid from the container 102 cannot remove further liquid through the line used to remove the second liquid 106. The flow of liquid out of the container 102 stops automatically, i.e., without intervention by the operator, through change of the bobber 132 from a first position in which flow is substantially permitted to a second position in which flow is substantially occluded.

However, the mechanical system may need to account for different characteristics of the liquids, such as oil and wastewater, being separated. The characteristics may include the API gravity of the liquids, for example. The bobber 132 could be selected to account for the API gravity of the liquids being separated, for example. Furthermore, the mechanical system may be susceptible to dirt or sludge and corrosion that may change the operation characteristics, such as the sliding and rotation, of the mechanical system over time. These changes over time may affect the efficiency in operation of the fluid separation device 100. While the mechanical system could be cleaned, coated to reduce corrosion over time, etc. as known to one skilled in the art, an electrical system may be able to operate in a wider range of fluids and not have the same susceptibilities to dirt or sludge and corrosion.

The electrical system may be considered to operate relatively independent of the specific characteristics of the liquids, for example. Such a system will now be described in further detail. However, it must be understood that aspects of the mechanical system and aspects of the electrical system may be used together or separately in keeping with the spirit of the present disclosure.

Figure 14:
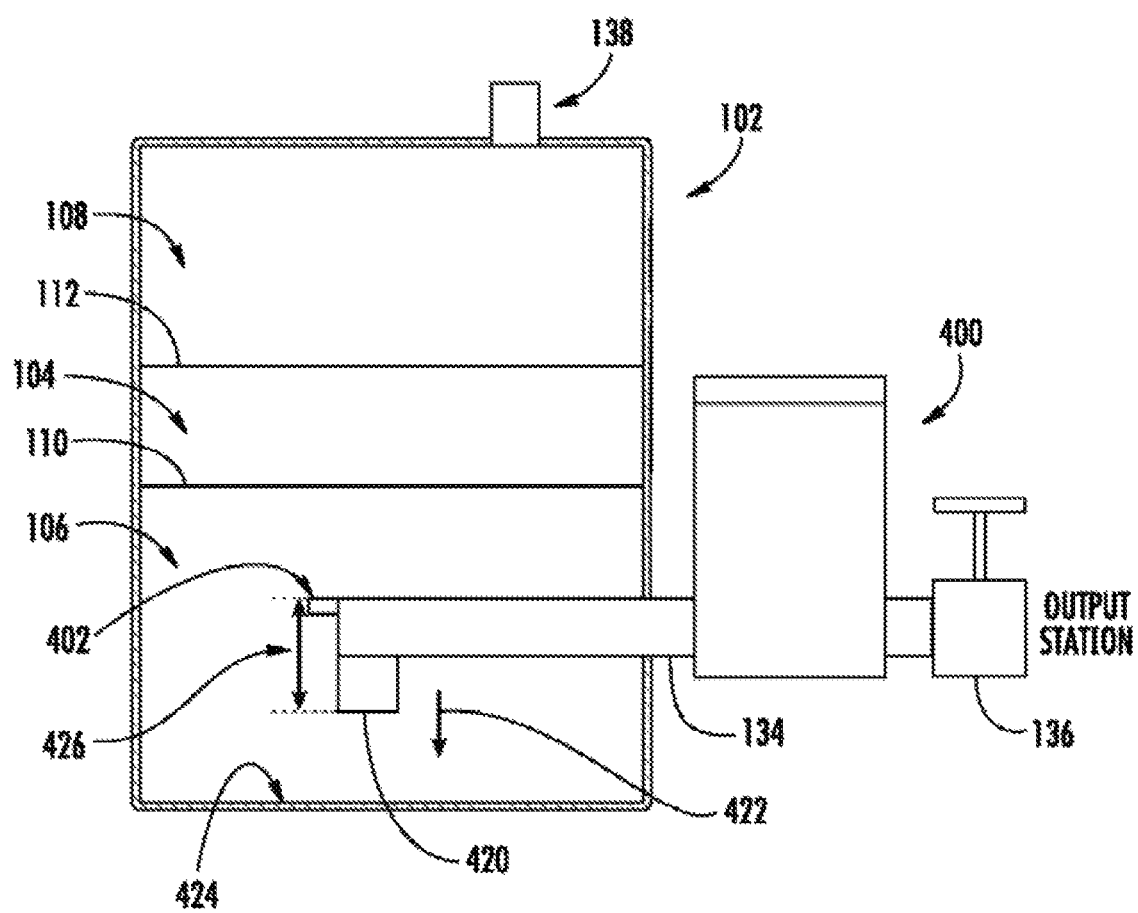
FIG. 14 shows an integrated sensor valve system in accordance with some embodiments of the present disclosure.
Figure 15:
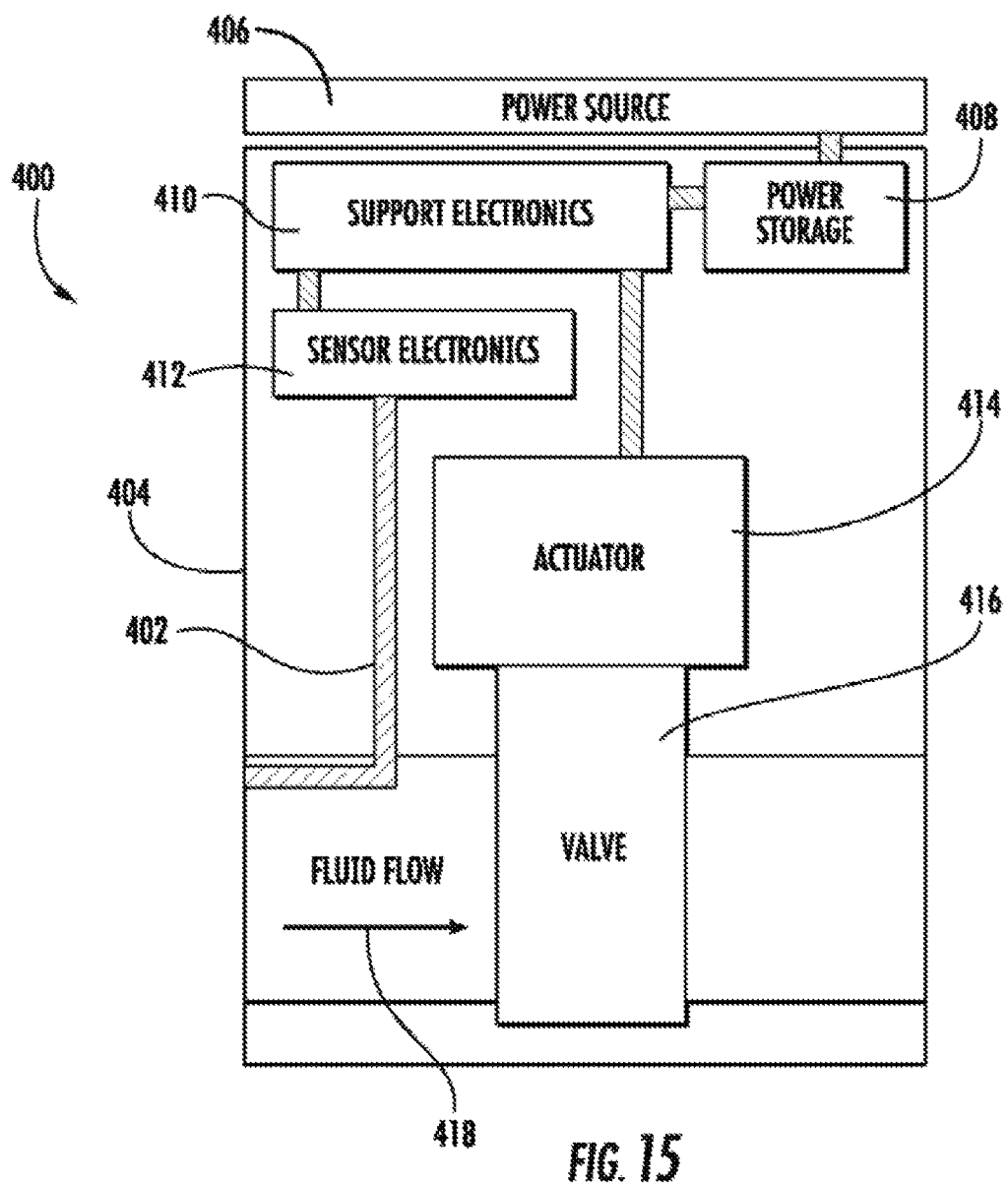
FIG. 15 shows in close-up an integrated sensor valve of FIG. 14.

FIGS. 14-15 show an integrated sensor valve (also known herein as ISV) 400 can provide a robust component that can be installed easily, quickly, and safely into an environment to operate as a fluid separation device for the container 102 that contains the first liquid 104 and the second liquid 106 with the first interface 110 between the first liquid 104 and the second liquid 106. The ISV 400 provides an interface sensor 402 that can detect the first interface 110. The interface sensor 402 could be any of a variety of sensors: float and displacer, guided wave radar, magnetic level indication, thermal dispersion, RE capacitance, ultrasonic, or laser, by way of example and not limitation. The ISV 400 may have one or more interface sensor 402. The interface sensor 402 can be directly installed in a plumbing conduit 403. The interface sensor 402 can then be positioned within the container 102 by positioning the ISV 400 in fluid communication between the container 102 and the valve 136.

The valve 136 can be a manual valve that is operated on by the operator, such as the pumper, to open or close the valve 136 to substantially permit or substantially occlude fluid flow from the container 102, respectively. The valve 136 would need to be in the open position for the ISV 400 to permit flow of fluid from the container 102 to the output station when the ISV 400 is positioned between the container 102 and the valve 136. In the closed position for the valve 136, the pumper or operator of the output station, such as a water truck, is now substantially prevented from having access to the fluid, such as the liquid 104 (e.g., oil), within the tank 102. The valve 136 may be any suitable valve, such as a three-inch ball valve or gate valve, known to one skilled in the art.

An enclosure 404 is configured to be large enough to contain various components used in the ISV 400. Besides being dimensioned to contain various components, the dimensions of the enclosure 404 provide sufficient room for the assembly and the maintenance of the components. The enclosure 404 can be constructed to conform to Class I Div. 2 industry standards, such as NEMA 4. See NEMA Enclosure Types at https://www.nema.org/Products/Documents/nema-enclosure-types.pdf:

Type 4: Enclosures constructed for either indoor or outdoor use to provide a degree of protection to personnel against access to hazardous parts; to provide a degree of protection of the equipment inside the enclosure against ingress of solid foreign objects (falling dirt and windblown dust); to provide a degree of protection with respect to harmful effects on the equipment due to the ingress of water (rain, sleet, snow, splashing water, and hose directed water); and that will be undamaged by the external formation of ice on the enclosure.

National Electrical Manufacturers Association, 1300 N. 17th St., Suite 1752, Rosslyn, Va. 22209. Other standards may be used outside of the United States. The point of the standard is to provide a safe enclosure as listed for type 4.

The ISV 400 has electronic components (e.g., support electronics, sensor electronics, and actuator) that will require a power source 406. The power source 406 can be a Class I Div. 2 power source, e.g.; a solar panel. An example of such a compliant Class I Div. 2 solar panel is the CID1 SENTINEL SOLAR SYSTEM, which is Class 1, Division 1, Temp Code T3, Groups C&D, conforms to UL Std. 913, and certified to Can/CSA Std C22.2 No. 157. (A source for the CID1 SENTINEL SOLAR SYSTEM is Signalfire Wireless Telemetry) The power source 406 may reside on, next to, or otherwise be adjacent to the enclosure 404, such that the power source 406 is electrically coupled to the electronic components in the enclosure 404 to provide the electronic components with power to operate. The power source 406 could come from the mains, but that may create Class I Div. 2 compliance issues, lead to increased costs for running power lines, etc.

The power source 406 may directly power the electronic components of the ISV 400. In addition, the power source 406 may be electrically coupled, wired or wireless, to a power storage 408. The power storage 408 may be a battery. An example of such a battery is as a NiMH Battery and charger Combination 24 v 4500 mAh—product ID 3365 sourced from Batteryspace. The power storage 408 would reside within the confines of the enclosure 404.

The power storage 408 is electrically coupled to support electronics 410. The support electronics 410 may include a battery charging circuit that is operatively coupled to the power storage 408 that is configured to charge the power storage 408 from power supplied by the power source 406, and a relay circuit that operatively. An example of such a relay circuit is API 1005 G, 4-20 mA to relay output, as might be obtained from Absolute Process Instruments, Inc. of Libertyville, Ill. 60048. Further, the support electronics 410 may include a relay circuit that is operatively coupled to the interface sensor 402. An example of such an interface sensor is Magnetrol, Kotron® Series 82 CE RF Transmitter level switch. (Trademarks are owned by their owners.) A source is Magnetrol International, Inc. Sensor electronics 412, e.g., signal or gain boost electronics, may be used to operatively couple the interface sensor 402 to the support electronics 410. The interface sensor 402 is sensitive to the interface between the first liquid 104 and the second liquid 106, namely the first interface 110.

When the interface sensor 402 is triggered by sensing the first interface 110 falling, i.e., moving towards the bottom of the container 102, to a predetermined position of the interface sensor 402, then the interface sensor 402 is configured to provide a "high" 4-20 mA signal to the relay circuit. The relay circuit in turn triggers the relay circuit's internal power relay to close. Closure of the relay circuit's internal power provides a power connection from the power storage 408 to an actuator 414. When powered, the actuator 414 rotates clockwise to turn a valve 416 to a CLOSED position from an OPEN position. An example of such an actuator is a CR-TEC VX Series electric actuator. A source is CR-TEC Engineering Inc., 7 Kimberly Lane, Madison, Conn. 06443-2080. An example of the valve is a butterfly valve, such as a Valworx Series 5644. A source is Valworx, Inc., 18636 Northline Drive, Cornelius, N.C. 28031. With the valve 416 in the CLOSED position, the liquid from the container 102 is substantially prevented from going through the valve 416 in a fluid flow direction 418 towards the valve 136, Of course, the "low" and "high" signals could be reversed. A bias element (not shown), such as but not limited to a spring, can be used to bias the valve 416 in the OPEN position, such that the valve 416 will transition from the CLOSED position to the OPEN position if valve 416 is in the CLOSED position when the actuator 414 loses power to maintain the valve 416 actuated in the OPEN position.

The fluid separation device 100 may be designed to keep the first interface 110 between the first liquid 104, such as oil, and the second liquid 106, such as water, always at or above the interface sensor 402. A drain port 420 can be configured with an opening downwards 422. The drain port 420 can be positioned substantially towards the bottom 424 of the container 102. For example, the drain port 420 could be positioned at a predetermined distance 426, such as about 6 inches, below the interface sensor 402. The ISV 400 can be configured so that during regular operation of the ISV 400 essentially none of the first liquid 104, e.g., oil, can leave, or escape, from the drain port 420.

Besides the drain port 420 pointing substantially downwards 422, i.e., substantially perpendicular to the bottom 424, the drain port could be being any configuration, such as substantially parallel to the bottom or even facing upwards. However, by pointing the drain port 420 downwards 422, it may be more difficult for the first fluid 104 to leave the container 102 through the output line 134 towards the valve 136.

When the second liquid 106, e.g., water, rises above the predetermined distance 426, then the interface sensor 402 provides a signal that goes "low". In response to this low signal, the relay circuit in opens. In response, power from the power storage 108 is now not connected, or is considered disconnected, from the actuator 414. In response, the actuator 414 rotates counterclockwise. This counterclockwise rotation of the actuator 414 transitions the valve 416 to an OPEN position from the CLOSED position. With the valve 416 in the OPEN position, fluid from the container 102 can now flow through the valve 416 in the fluid flow direction 418 to the valve 136. When the valve 416 is in the OPEN position, the pumper, or operator of the output station, can access the second liquid 106, e.g., water, within the container 102 through the valve 136.

Other configurations of the ISV 400 are contemplated. The above discussed configuration is intended to be exemplary and not limiting. The ISV 400 can be used in conjunction with the mechanical systems disclosed herein that make use of the float member 132. The float member 132 and the interface sensor 402 may work in a complementary fashion to substantially prevent the first liquid from leaving the container 102 through the output line 134. For example, the float member 132 may still operate after a power outage incapacitates the ISV 400. Such a power outage could be due to a natural phenomenon, such as lightning.

As discussed hereinabove, there exists a need to address the issue of wastewater disposal and the associated problem of excess oil contaminating the water load of a disposal transport tank. The oil, whether accidentally or intentionally, pumped from storage containers represents potentially as much as two percent of the total product produced worldwide. The disclosure may address the challenge to develop a simple and reliable device and method that prevents oil from entering the wastewater transport tank, which is typically a vacuum-operated pumper truck.

Passive Mechanical Configuration.

One option disclosed is a passive mechanical configuration that uses a float member that sinks in oil and floats in water. The float member may be a solid polypropylene float member, by way of example and not limitation. The float member may be a cylindrical float member, a spherical float member, etc. The SG of the float member may be 0.95, by way of example and not limitation. The operation of the passive mechanical configuration may have the float member occlude a suction line when the interface reaches a predetermined level.

This configuration may provide a viable and straight forward mechanism in principle, but complications may occur due to the associated chemistry of the 2 constituents: wastewater, which is typically a salt brine infused with trace amounts of a wide variety of petroleum distillates with variations in specific gravity, and the oil, which in its raw form exhibits a wide degree of variation in specific gravity and that specific gravity may sometimes be very close to the specific gravity of the wastewater.

Additionally, the oil also may contain dissolved brine water in the solution acting as an emulsion. This emulsion may change its density due to temperature and chemical factors. Therefore, it may be a complicated procedure to calibrate a float member to achieve an appropriate density, such that the float member maintains a proper position at the interface of the two fluids, i.e., the brine water and the oil. Proper interfacial positioning may be needed for the operation of the passive mechanical configuration.

To achieve proper positioning of the float member, precise analysis of the respective fluid density of each fluid in the container may be required. Density measurements may not be difficult, by themselves, to acquire. A difficulty may reside in the fact that the respective fluid density values of the brine water and the oil are not static. And while it can be assumed that a given well will tend to produce a consistent ratio of wastewater to crude oil for some period of time, it may not be reasonable to expect all wells to maintain a ratio that is consistent over some period of time, such as several months. A well that produces water may tend to produce more water over the life of the well. The temperature of the stored fluids may also factor in accurately measuring density. Colder oil may tend to retain more water, while warm conditions may tend to aid in the water being ejected from the oil. Conditions may also exist in which the oil, when cold again, may re-absorb water even after some desorption. All these conditions, and more, may tend to complicate a passive mechanical configuration.

The passive mechanical configuration with the float member may be functional under all the aforementioned conditions. But if a sufficient density change occurs in the oil, e.g., the oil gains water, and there exists simultaneously a large volume of oil emulsion in the storage tank, the float member may tend to be pulled upward out of the volume of water and towards and even into the volume of oil. The result may be that if the container is then serviced through removal of wastewater, some portion of the oil from the container may be pumped into the wastewater load. To help ensure the proper operation of the passive mechanical configuration, consistent fluid analysis may be paramount, along with the associated recalibration of the float member through substitution or replacement.

The passive mechanical configuration may be potentially cumbersome and costly, both to develop and to produce due to the physical hardware necessary to both analyze fluids on the site of the storage container, and then to calibrate and install or replace the float member, which may be potentially burdensome for the operator. It may be, however, that for some installations, such as but not limited to extreme environments, the passive mechanical configuration may be the more practical to install and maintain then other options disclosed.

Active Electronic Configuration.

There exists another solution that utilizes active, i.e., powered electronics. Electrical solutions May present several inherent challenges for use on the site of the storage tank, such as power requirements and environmental issues (e.g., extreme temperatures, rain, snow, and/or very hot conditions), as well as hazardous atmospheres to which the unit may be exposed. Installation sites may be typically NEC Class I, Division 1. locations. There may exist, however, a variety of hardware well suited for this particular set of constraints: solar powered battery systems; liquid/foam interface detection equipment; automatic valve hardware; and telemetry systems. The assemblage of this hardware, properly configured, may be easily; effectively, and reliably detect a fluid interface, activate shut-off valve components, and thus prevent the loss of valuable product. A suitable packaging solution may be required to meet existing environmental code standards. A custom enclosure may be necessary.

Active Mechanical Configuration.

A fundamental challenge in the passive mechanical configuration may be to develop a method whereby the float member can readily adapt to the changing fluid conditions that directly affect the associated specific gravity of the fluids. Ideally, the float member may be disposed precisely at the midpoint of the oil/water interface, however other positions at the oil/water interface may be operational to occlude the oil from leaving the storage tank. To accomplish positioning of the float member, the portion of the float member residing in the volume of oil emulsion could maintain a specific gravity that is substantially equal to the specific gravity of the oil emulsion at the oil/water interface. The same is true for that portion of the float member that resides in the brine water, i.e., the SG of the float member in the brine water may be substantially equal the SG of the brine water in which that portion of the float member resides.

One skilled in the art will understand that the float member is not imaginary. The float member is a physical device, and as such the float member has a mass-density of its own, which is independent and not necessarily equal to that of either fluid in the environment of the container. The portions of the float member may have SG that may be less than, substantially equal to, or greater than 1. For practical purposes, the SG of the float member may be neutral, as relates to the oil/water interface region. While it may be correct that the container cannot be simultaneously neutral in both oil and water fluids, the float member can be virtually, or functionally, neutral in the brine water, and the float member may even have slightly positive buoyancy relative to the brine water. In the active mechanical configuration, the operator or machine that may be under the operator's control may change the specific gravity, SG, of the float member during or between operation of the float member to substantially prevent oil from leaving the storage container.

Figure 16:
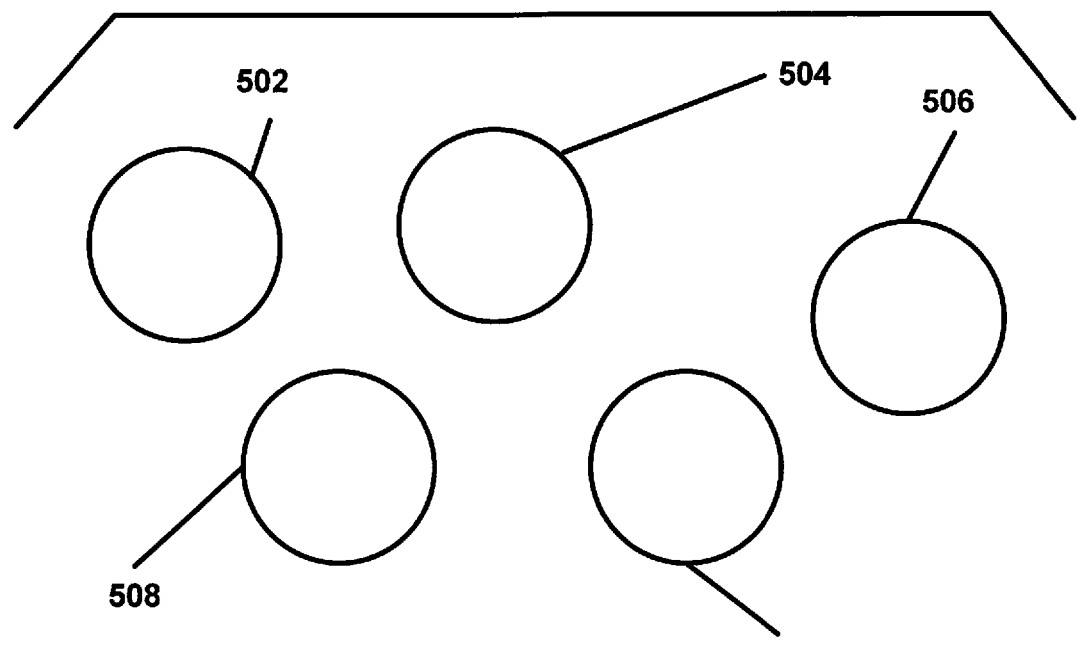
FIG. 16 shows a kit of float members in accordance with some embodiments of the present disclosure.

As shown in FIG. 16, in one embodiment the operator may be provided with a kit 500 of float members and each float member has a different specific gravity. For example, the kit may include a first float member 502 with a specific gravity of 0.92, a second float member 504 with a specific gravity of 0.93, a third float member 506 with a specific gravity of 0.94, a fourth float member 508 with a specific gravity of 0.95, and a fifth float member 510 with a specific gravity of 0.96 or any other suitable range of specific gravity values. Of course, the kit 500 may have lesser greater than 5 float members. Then, based on measurement of specific gravity currently in the container or about to be placed in the container, known values based on historical records or prior usage, etc. for the specific gravity of the oil and the specific gravity of the brine water used in a storage container, the operator may select the float member with the specific gravity that promotes efficient operation of the oil separation device, such that oil is left in the container when water is removed from the container.

Measurement of the specific gravity of the liquid may occur when the liquid is in the container. Measurement of the specific gravity of the liquid may occur when the liquid is not yet in the container. In this situation, the liquid might be prepared to be placed in the container, but it is not there yet.

Known values of specific gravity of the liquid may be based on historical records of prior measurements of specific gravity at the site, well, etc. being used. Unlike measurement of the specific gravity of the liquid in the container or not yet placed in the container, the known values based on historical records or prior usage may be based on measurements of specific gravity of the liquid previously in the container or previously prepared to be placed in the container but the liquid has now passed through the container.

Of course, the owner of the oil in the tank may be the one to control the specific gravity of the float member while the operator of the water truck has no control, such that the owner of the oil is in control of how efficiently the oil separation device and method works. The float member may be locked and only accessible by the owner of the oil in the tank.

Figure 17:
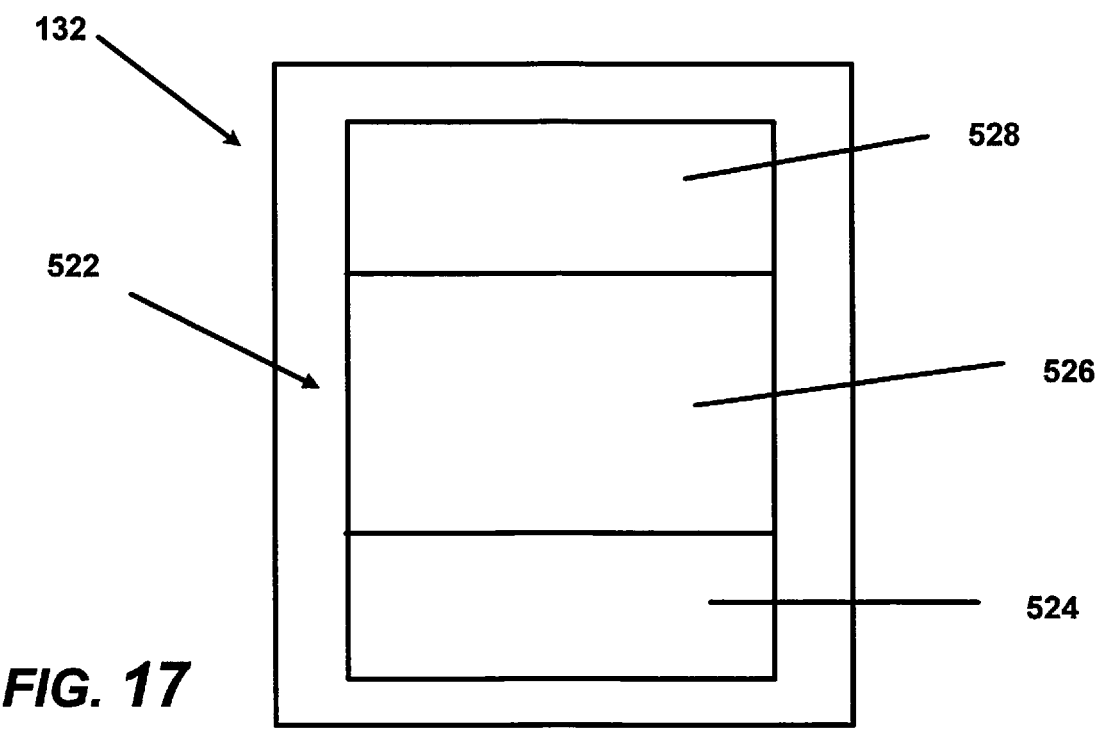
FIG. 17 shows in cross-section a float member with a cavity in accordance with some embodiments of the present disclosure.

As shown in FIG. 17, in another embodiment a float member 132 may be include a bladder 522 to store bladder materials of various densities. For example, the bladder materials may be a sample of the oil in the storage container 524, a sample of the brine water in the storage container 526, and a sample of air 528 that may be incidentally present or actively inserted to create a desired SG for the float member 132. In this embodiment, the float member 132 may have one cavity in the bladder into which bladder materials are inserted. In this configuration, the bladder materials of the one cavity of the bladder may essentially mirror the fluids of the container in which the float member operates. The bladder material that is most dense will be on the bottom of the cavity and the bladder material that is least dense will be on top of the cavity and the latter material with density between the most dense latter material and the least dense bladder material will be in between. Variable buoyancy can be achieved by introducing a volume of air into the brine containment volume, for example.

Figure 18:
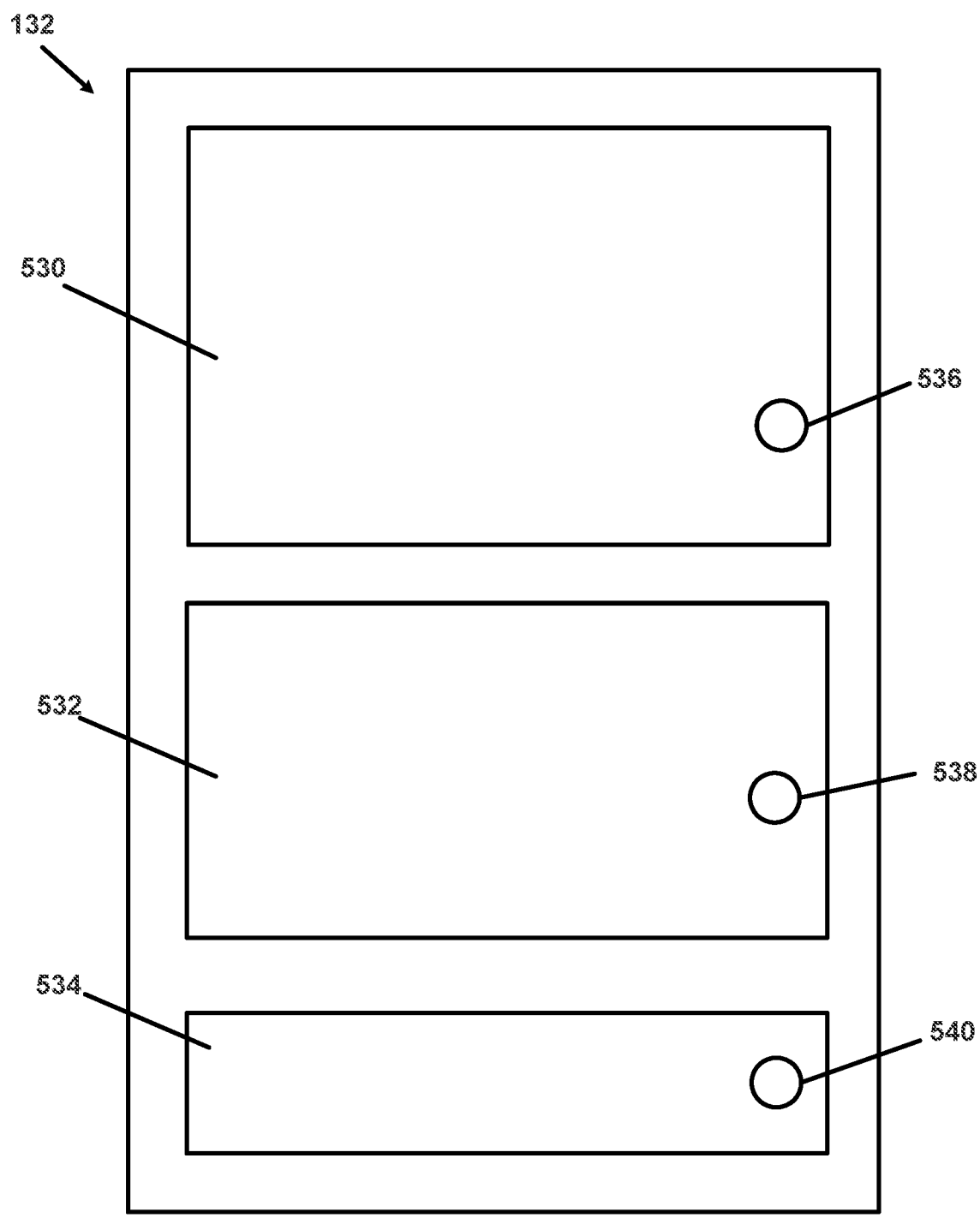
FIG. 18 shows in cross-section a float member with substantial symmetry about a central vertical axis in accordance with some embodiments of the present disclosure.
Figure 19:
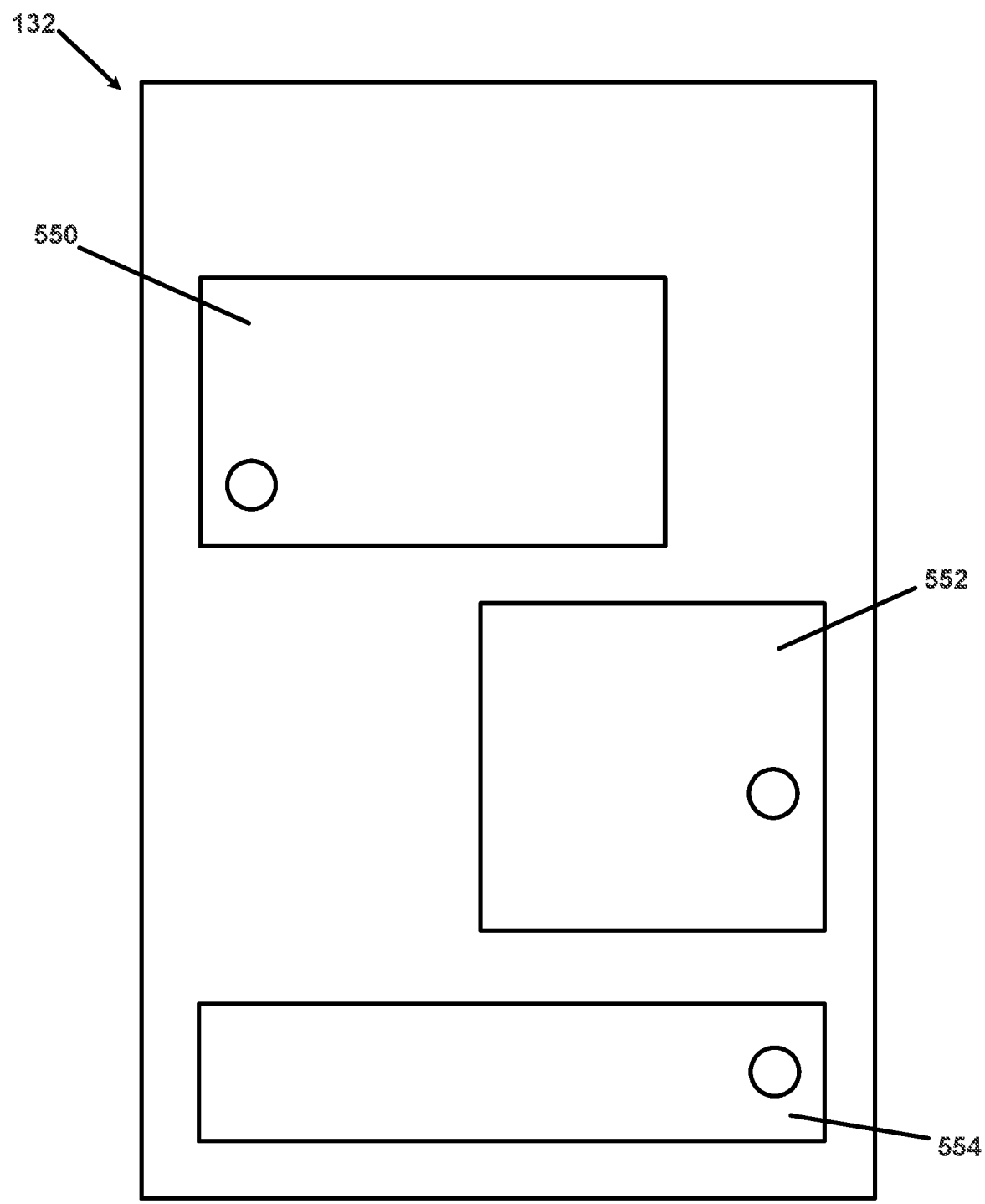
FIG. 19 shows in cross-section a float member with substantial asymmetry about a central vertical axis in accordance with some embodiments of the present disclosure.

As shown in FIG. 18, in another embodiment the float member 132 may include a plurality of cavities, such as a first cavity 530, a second cavity 532, and a third cavity 534, that function as chambers for each of the bladder materials that are inserted into the float member through an access port. The first cavity may have a first access port 536. The second cavity may have a second access port 538. The third cavity may have a third access port 540. Of course, there may be more or less than 3 cavities, and the cavities may be of substantially similar or substantially different volumes. The cavities may be relatively symmetrically placed within the float member 132 as shown in FIG. 18 or the cavities may be relatively asymmetrically placed within the float member 132 as shown in FIG. 19, wherein a fourth cavity 550, a fifth cavity 552, and a sixth cavity 554 are shown asymmetrically arranged within the float member 132. Each cavity may contain one or more of the bladder materials, such as water, oil, air, or other liquid or solid, or even gas. An interesting aspect of the float member having a plurality of cavities is that there will may be an opportunity to include low-density material, such as air, within more than one location, i.e., chamber, of the float member 132.

Figure 20:
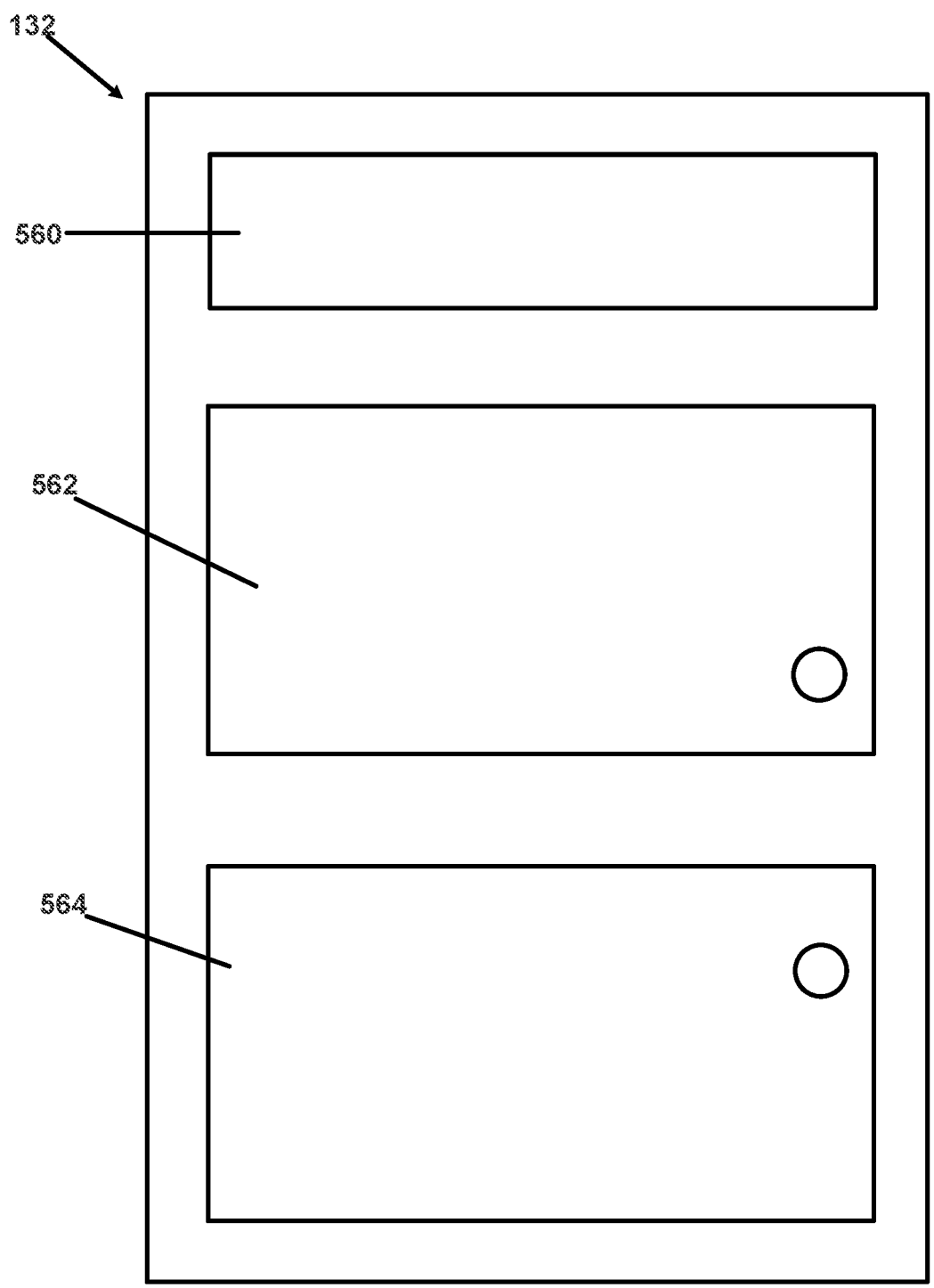
FIG. 20 shows in cross-section a float member with operator accessible cavities for bladder material and a user inaccessible cavity without destruction of the float member in accordance with some embodiments of the present disclosure.
Figure 21:
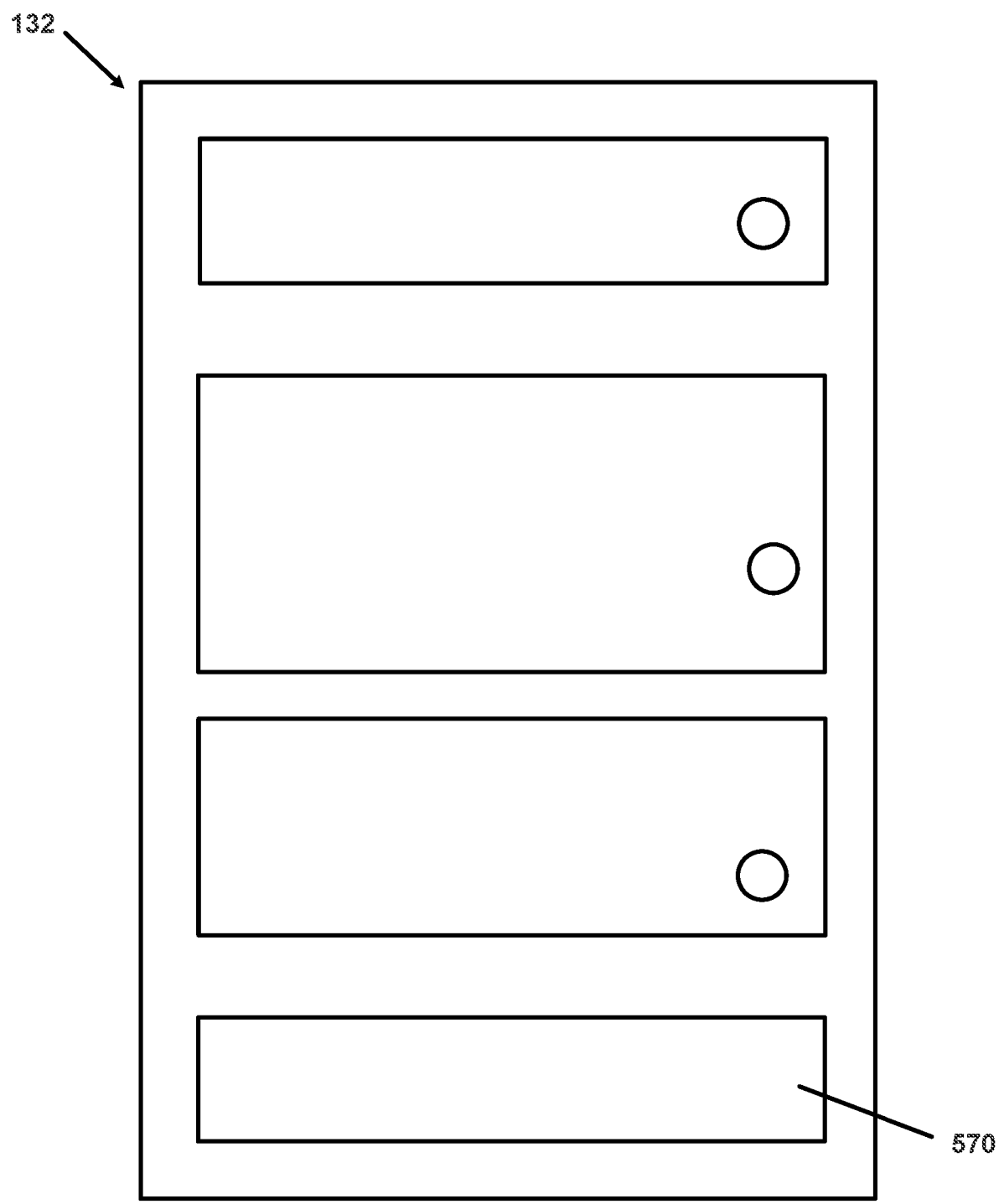
FIG. 21 shows in cross-section a float member with a seat of density to create a substantial asymmetry about a central horizontal axis in accordance with some embodiments of the present disclosure.

Furthermore, while the bladder materials may be inserted into the float member 132 by an operator through an access port for each cavity, it is also possible to pre-configure the float member with bladder materials in specific regions of the float member. For example, a preconfigured chamber of air 560 may be in the float member 132, wherein the preconfigured chamber of air 560 does not have an access port that the operator can interact with to insert the bladder material as shown in FIG. 20. The preconfigured chamber 560 is not accessible by the operator for changing the bladder material, while a seventh cavity 562 and an eighth cavity 564 are operator accessible for changing the bladder material. The bladder material in the preconfigured chamber 560 may be established during the manufacturing process.

Similarly, FIG. 2.1 shows in embodiment in which the float member 132 may be preconfigured to be asymmetric with respect to specific gravity through use of a material that is more dense than the other bladder materials that may be inserted into the float member 132. This area of more density may be considered a seat 570 to orient the float member with respect to the storage container for the oil and water. The seat 570 may be present in the float member that has a cylindrical shape, a spherical shape, or other suitable shape.

Figure 22:
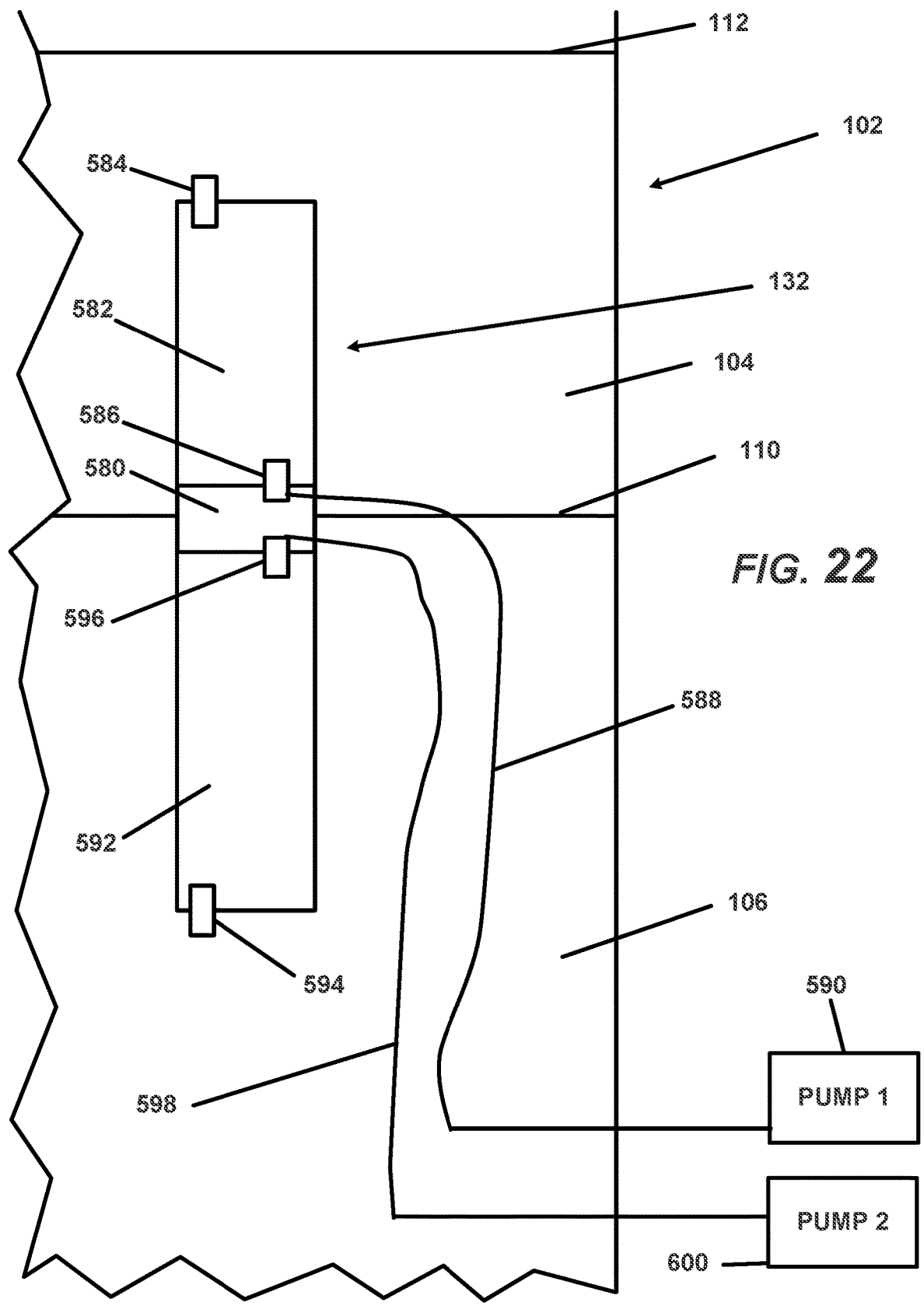
FIG. 22 shows a schematic for a system with a float member of variable specific gravity for separation of fluid in accordance with some embodiments of the present disclosure.

As shown in FIG. 22, amount and constitution of the bladder materials in the float member 132 can be actively manipulated by an external pump as shown, or syringe via tube and ported connections. The tank 102 is configured to contain the first liquid 104 and the second liquid 106. The first interface 110 is between the first liquid 104 and the second liquid 106. In addition, there is the second interface 112 on top of the first liquid 104.

The float member 132 may include a first sample fluid cavity coupled to a second fluid sample cavity with a manifold 580 therebetween. The manifold 580 is optional and may provide some structural integrity to the float member 132. The value of the density of the manifold 580 may be chosen to have the manifold 580 be disposed at about the level of the first interface 110. For simplicity, the retention member for the float member 132 is not shown.

The first fluid sample cavity 582 may have a first entry port 584 configured to allow a sample of the first liquid to enter the first fluid sample cavity 582 through the first entry port. Further, the first fluid sample cavity 582 may have a first exit port 586 to allow the sample of the first liquid to exit the first fluid filled cavity 582 through the first exit port 586. The sample of the first liquid may then travel via a first pull line 588 towards a first pump 590. In other words, fluid in the float member 132 may be swapped out for the first fluid on a regular basis, such as every dump, or water pulling, cycle, by the first pump 590 pulling fluid from the first sample fluid cavity 582 and replenishing fluid in the first sample fluid cavity 582 with the first liquid 104 currently in the container 102.

Similarly, the second fluid sample cavity 592 may have a second entry port 594 configured to allow a sample of the second liquid to enter the second fluid sample cavity 592 through the second entry port 594, and the second fluid sample cavity 592 may have a second exit 596 port to allow the sample of the second liquid to exit the second fluid filled cavity 592 through the second exit port 596. The sample of the second liquid may then travel via a second pull line 598 towards a second pump 600. Again, fluid in the float member 132 may be swapped out for the second fluid on a regular basis, such as every dump, or pulling, cycle, by the second pump 600 pulling fluid from the second fluid cavity 592 and replenishing fluid in the second sample fluid cavity with the second liquid 106 currently in the container 102.

If thickness of the walls for the cavities of the float member 132 are kept sufficiently small relative to the overall fluid volume, then the effects of the volume and density of the float member 132, apart from the fluid contained therein, may be suitably small, such that changing the fluid in the float member 132 allows the operator to control the specific gravity of the float 132 to optimize performance of the float member 132 in the container 102.

The first pump 590 is configured to have suitable power source and electronics, as is the second pump 600.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
   a float member configured in contacting adjacency to a first liquid and a second liquid contained within a container, the first liquid is less dense than the second liquid, such that the first liquid floats on top of the second liquid;
   an output line in fluid communication with an interior of the container when the float member is in a first position and the output line is substantially not in fluid communication with the interior of the container when the float member is in a second, different position, and the float member assumes the second, different position responsive to removal of the second liquid from the container; and
a pump in fluid communication with the interior of the container, wherein the pump is configured to pull the first liquid or the second liquid into the float member to thereby affect specific gravity of the float member, wherein the pump is characterized as a first pump, further comprising a second pump in fluid communication with the interior of the container, wherein the first pump is configured to pull the first liquid into the float member to thereby affect specific gravity of the float member, and the second pump is configured to pull the second liquid into the float member to thereby affect specific gravity of the float member.

2. The apparatus of claim 1, further comprising:
a first cavity in the float member;
a first entry port configured to provide fluid communication between the interior of the container and the first cavity;
a first exit port configured to provide fluid communication between the first cavity and the first pump;
a second cavity in the float member;
a second entry port configured to provide fluid communication between the interior of the container and the second cavity; and
a second exit port configured to provide fluid communication between the second cavity and the second pump.

3. The apparatus of claim 2, further comprising:
a manifold configured to support the first exit port and the second exit port, and the manifold is further configured to be disposed at approximately a level of an interface between the first liquid and the second liquid within the container.

4. The apparatus of claim 1, further comprising:
a cavity in the float member;
an entry port configured to provide fluid communication between the interior of the container and the cavity; and
an exit port configured to provide fluid communication between the cavity and the pump.

5. The apparatus of claim 1, wherein the first liquid or the second liquid are pulled into the float member after the container is filled with the first liquid and the second liquid.

6. An apparatus comprising:
a float member configured in contacting adjacency to a first liquid and a second liquid contained within a container, the first liquid is less dense than the second liquid, such that the first liquid floats on top of the second liquid;
an output line in fluid communication with an interior of the container when the float member is in a first position and the output line is substantially not in fluid communication with the interior of the container when the float member is in a second, different position, and the float member assumes the second, different position responsive to removal of the second liquid from the container; and
a pump in fluid communication with the interior of the container, wherein the pump is configured to pull the first liquid or the second liquid into the float member to thereby affect specific gravity of the float member, wherein the pump is characterized as a first pump, further comprising a second pump in fluid communication with the interior of the container, wherein the first pump is configured to pull the first liquid into the float member to thereby affect specific gravity of the float member, and the second pump is configured to pull the second liquid into the float member to thereby affect specific gravity of the float member, and the first liquid or the second liquid are pulled into the float member after the container is filled with the first liquid and the second liquid.

7. The apparatus of claim 6, further comprising:
a cavity in the float member;
an entry port configured to provide fluid communication between the interior of the container and the cavity; and
an exit port configured to provide fluid communication between the cavity and the first pump.

8. The apparatus of claim 6, further comprising:
a cavity in the float member;
an entry port configured to provide fluid communication between the interior of the container and the cavity; and
an exit port configured to provide fluid communication between the cavity and the second pump.

9. The apparatus of claim 6, further comprising:
a first cavity in the float member;
a first entry port configured to provide fluid communication between the interior of the container and the first cavity;
a first exit port configured to provide fluid communication between the first cavity and the first pump;
a second cavity in the float member;
a second entry port configured to provide fluid communication between the interior of the container and the second cavity; and
a second exit port configured to provide fluid communication between the second cavity and the second pump.

10. The apparatus of claim 9, further comprising:
a manifold configured to support the first exit port and the second exit port, and the manifold is further configured to be disposed at approximately a level of an interface between the first liquid and the second liquid within the container.

* * * * *